US011969718B2

(12) United States Patent
Monwar et al.

(10) Patent No.: US 11,969,718 B2
(45) Date of Patent: Apr. 30, 2024

(54) MODIFIED SUPPORTED CHROMIUM CATALYSTS AND ETHYLENE-BASED POLYMERS PRODUCED THEREFROM

(71) Applicant: Chevron Phillips Chemical Company LP, The Woodlands, TX (US)

(72) Inventors: Masud M. Monwar, Bartlesville, OK (US); Carlos A. Cruz, Kingwood, TX (US); Jared L. Barr, Bartlesville, OK (US); Max P. McDaniel, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 18/167,129

(22) Filed: Feb. 10, 2023

(65) Prior Publication Data

US 2023/0182121 A1  Jun. 15, 2023

Related U.S. Application Data

(62) Division of application No. 17/737,150, filed on May 5, 2022, which is a division of application No. (Continued)

(51) Int. Cl.
*C08F 110/02* (2006.01)
*B01J 8/08* (2006.01)
(Continued)

(52) U.S. Cl.
CPC ............... *B01J 31/12* (2013.01); *B01J 8/085* (2013.01); *B01J 8/18* (2013.01); *B01J 19/123* (2013.01);
(Continued)

(58) Field of Classification Search
CPC .......... C08F 110/03; C08F 210/16; C08F 4/78
See application file for complete search history.

(56) References Cited

U.S. PATENT DOCUMENTS 2,857,442 A  10/1958 Hay
3,166,537 A  1/1965 Gregg
(Continued)

FOREIGN PATENT DOCUMENTS

CN  1150766 C  5/2004
CN  101264953 B  8/2010
(Continued)

OTHER PUBLICATIONS

Search Report issued in related Chinese Application No. 2019800569668, dated Nov. 3, 2022, 4 pp.
(Continued)

*Primary Examiner* — Caixia Lu
(74) *Attorney, Agent, or Firm* — Merchant & Gould P.C.

(57) ABSTRACT

Supported chromium catalysts with an average valence less than +6 and having a hydrocarbon-containing or halogenated hydrocarbon-containing ligand attached to at least one bonding site on the chromium are disclosed, as well as ethylene-based polymers with terminal alkane, aromatic, or halogenated hydrocarbon chain ends. Another ethylene polymer characterized by at least 2 wt. % of the polymer having a molecular weight greater than 1,000,000 g/mol and at least 1.5 wt. % of the polymer having a molecular weight less than 1000 g/mol is provided, as well as an ethylene homopolymer with at least 3.5 methyl short chain branches and less than 0.6 butyl short chain branches per 1000 total carbon atoms.

20 Claims, 4 Drawing Sheets

Related U.S. Application Data

16/571,228, filed on Sep. 16, 2019, now Pat. No. 11,376,575.

(60) Provisional application No. 62/732,020, filed on Sep. 17, 2018.

(51) Int. Cl.

| | | |
|---|---|---|
| *B01J 8/18* | (2006.01) | |
| *B01J 19/12* | (2006.01) | |
| *B01J 31/12* | (2006.01) | |
| *C08F 4/78* | (2006.01) | |
| *C08F 10/02* | (2006.01) | |
| *C08F 210/16* | (2006.01) | |
| *B01J 21/08* | (2006.01) | |
| *B01J 23/26* | (2006.01) | |
| *B01J 31/34* | (2006.01) | |
| *B01J 37/16* | (2006.01) | |
| *B01J 37/34* | (2006.01) | |
| *C08F 4/22* | (2006.01) | |

(52) U.S. Cl.
CPC ............ *C08F 10/02* (2013.01); *C08F 110/02* (2013.01); *C08F 210/16* (2013.01); *B01J 21/08* (2013.01); *B01J 23/26* (2013.01); *B01J 31/34* (2013.01); *B01J 37/16* (2013.01); *B01J 37/34* (2013.01); *B01J 37/344* (2013.01); *B01J 37/345* (2013.01); *B01J 2219/0869* (2013.01); *B01J 2219/089* (2013.01); *B01J 2219/1203* (2013.01); *B01J 2531/62* (2013.01); *C08F 4/22* (2013.01); *C08F 4/78* (2013.01)

(56) References Cited

U.S. PATENT DOCUMENTS

| | | | |
|---|---|---|---|
| 3,201,476 A | | 8/1965 | Baker |
| 3,242,099 A | | 3/1966 | Manyik |
| 3,245,179 A | | 4/1966 | Hawkins |
| 3,694,422 A | | 9/1972 | Long |
| 3,857,901 A | | 12/1974 | Dowden |
| 3,887,494 A | | 6/1975 | Dietz |
| 4,248,735 A | | 2/1981 | McDaniel |
| 4,393,253 A | | 7/1983 | Michaelson |
| 4,460,756 A | | 7/1984 | McDaniel |
| 4,501,885 A | | 2/1985 | Sherk |
| 4,588,790 A | | 5/1986 | Jenkins, III |
| 4,794,096 A | | 12/1988 | Ewen |
| 4,808,561 A | | 2/1989 | Welborn, Jr. |
| 5,220,080 A | | 6/1993 | Lyons |
| 5,352,749 A | | 10/1994 | Dechellis |
| 5,436,304 A | | 7/1995 | Griffin |
| 5,565,175 A | | 10/1996 | Hottovy |
| 5,575,979 A | | 11/1996 | Hanson |
| 5,576,259 A | | 11/1996 | Hasegawa |
| 5,635,438 A | | 6/1997 | Cowfer |
| 5,739,220 A | | 4/1998 | Shamshoum |
| 5,807,938 A | | 9/1998 | Kaneko |
| 5,919,983 A | | 7/1999 | Rosen |
| 5,955,557 A | * | 9/1999 | Machida ............... C08F 10/02 526/348.3 |
| 6,239,235 B1 | | 5/2001 | Hottovy |
| 6,262,191 B1 | | 7/2001 | Hottovy |
| 6,310,167 B1 | * | 10/2001 | Kanzawa ............. C08F 110/02 502/155 |
| 6,518,375 B1 | | 2/2003 | Monoi |
| 6,825,377 B1 | | 11/2004 | Beller |
| 6,833,415 B2 | | 12/2004 | Kendrick |
| 7,112,643 B2 | | 9/2006 | McDaniel |
| 7,238,756 B2 | | 7/2007 | Ehrman |
| 7,294,599 B2 | | 11/2007 | Jensen |
| 7,304,199 B2 | | 12/2007 | Xu |
| 7,326,760 B2 | | 2/2008 | Cann |
| 7,407,591 B2 | | 8/2008 | De Battisti |
| 7,531,606 B2 | | 5/2009 | Hendrickson |
| 7,598,327 B2 | | 10/2009 | Shaw |
| 7,601,665 B2 | | 10/2009 | McDaniel |
| 7,648,940 B2 | | 1/2010 | Holtcamp |
| 7,649,062 B2 | | 1/2010 | Matsunaga |
| 7,884,163 B2 | | 2/2011 | McDaniel |
| 7,956,138 B2 | | 6/2011 | Holtcamp |
| 8,114,353 B2 | | 2/2012 | Benham |
| 8,114,946 B2 | | 2/2012 | Yang |
| 8,309,485 B2 | | 11/2012 | Yang |
| 8,623,973 B1 | | 1/2014 | McDaniel |
| 8,703,886 B1 | | 4/2014 | Yang |
| 8,822,608 B1 | | 9/2014 | Bhandarkar |
| 8,969,228 B2 | | 3/2015 | Nazarpoor |
| 9,006,367 B2 | | 4/2015 | McDaniel |
| 9,023,959 B2 | | 5/2015 | McDaniel |
| 9,096,699 B2 | | 8/2015 | McDaniel |
| 9,169,337 B2 | | 10/2015 | Rohatgi |
| 9,273,170 B2 | | 3/2016 | Hlavinka |
| 9,346,897 B2 | | 5/2016 | Cui |
| 9,394,393 B2 | | 7/2016 | Hlavinka |
| 9,540,457 B1 | | 1/2017 | Ding |
| 9,758,599 B2 | | 9/2017 | Ding |
| 9,796,798 B2 | | 10/2017 | Praetorius |
| 9,802,841 B2 | | 10/2017 | Maruo |
| 9,988,468 B2 | | 6/2018 | McDaniel |
| 10,000,594 B2 | | 6/2018 | Hlavinka |
| 10,213,766 B2 | | 2/2019 | Praetorius |
| 10,246,528 B2 | | 4/2019 | McDaniel |
| 10,287,369 B2 | | 5/2019 | Schwerdtfeger |
| 10,358,506 B2 | | 7/2019 | Ding |
| 10,435,527 B2 | | 10/2019 | Praetorius |
| 10,442,881 B2 | | 10/2019 | Hlavinka |
| 10,654,953 B2 | | 5/2020 | McDaniel |
| 10,662,266 B2 | | 5/2020 | McDaniel |
| 10,835,890 B2 | | 11/2020 | Cann |
| 10,858,459 B2 | | 12/2020 | McDaniel |
| 2004/0059070 A1 | | 3/2004 | Whitte |
| 2007/0219085 A1 | | 9/2007 | De Battisti |
| 2008/0032886 A1 | | 2/2008 | Yeh |
| 2013/0206453 A1 | | 8/2013 | Fagrell |
| 2014/0221692 A1 | | 8/2014 | Netemeyer |
| 2015/0191554 A1 | | 7/2015 | McDaniel |
| 2017/0073439 A1 | | 3/2017 | Ewart |
| 2017/0274356 A1 | | 9/2017 | Cann |
| 2018/0079845 A1 | | 3/2018 | Doufas |
| 2019/0153129 A1 | | 5/2019 | McDaniel |
| 2019/0184389 A1 | | 6/2019 | Neygandhi |
| 2019/0308172 A1 | | 10/2019 | Zou |
| 2020/0086307 A1 | | 3/2020 | Monwar |
| 2020/0087430 A1 | | 3/2020 | Clear |
| 2020/0239605 A1 | | 7/2020 | McDaniel |
| 2021/0077981 A1 | | 3/2021 | Cruz |
| 2021/0078920 A1 | | 3/2021 | Cruz |
| 2021/0078926 A1 | | 3/2021 | Barr |
| 2021/0078927 A1 | | 3/2021 | McDaniel |
| 2022/0081370 A1 | | 3/2022 | Monwar |

FOREIGN PATENT DOCUMENTS

| | | |
|---|---|---|
| CN | 108203476 A | 6/2018 |
| CN | 106317267 B | 12/2018 |
| CN | 104774280 B | 9/2019 |
| CN | 106893015 B | 9/2019 |
| CN | 108439533 B | 7/2020 |
| CN | 107311263 B | 11/2020 |
| CN | 107108800 B | 3/2021 |
| DE | 2653666 A1 | 5/1978 |
| EA | 027672 B1 | 8/2017 |
| EP | 1041085 B1 | 8/2002 |
| GB | 1350560 A | 4/1974 |
| JP | 05310601 A | 11/1993 |
| JP | H10182742 A | 7/1998 |
| JP | 2004244557 A | 9/2004 |
| JP | 2012101986 A | 5/2012 |
| RU | 2191625 C1 | 10/2002 |
| WO | 2005107943 A1 | 11/2005 |
| WO | 2015034816 A2 | 3/2015 |

(56) References Cited

FOREIGN PATENT DOCUMENTS

| WO | 2018125690 A1 | 7/2018 |
|---|---|---|
| WO | 2020060889 A2 | 3/2020 |
| WO | 2021055271 A1 | 3/2021 |
| WO | 2021055272 A1 | 3/2021 |

OTHER PUBLICATIONS

First Examination Report issued in related application No. 202117008239, dated Sep. 21, 2022, 8 pp.
Search Report issued in related Chinese Patent Application 2019800552794, dated Sep. 21, 2022, 2 pp.
Awasthy, A.K. and Jan Rocek, "The Nature of the Transition State in the Oxidation of Olefins by Chromium (VI)," JACS 91;4, Feb. 12, 1969, pp. 991-996.
Baker, L. M., et al., Oxidation of olefins by supported chromium oxide, The Journal of Organic Chemistry, vol. 33, No. 2, pp. 616-618 (Year: 1968).
Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.
Brunauer, et al., "Adsorption of Gases in Multimolecular Layers," Journal of the American Chemical Society. 1938, vol. 60, pp. 309-319.
Christian Limberg, et al., "NMR Spectroscopic Evidence for Chromium(VI) Alkoxides With a-hydrogen Atoms," Chem. Commun., Dec. 31, 1998, pp. 225-226.
Cotton, F. Albert, et al., "Advanced Inorganic Chemistry," Sixth Edition, cover page, title page, pp. ix-x, and book description, Mar. 30, 1999, John Wiley & Sons, Inc.
Economy, et.al., "Supported Barium Chromate—A New Oxidation Catalyst", J. Catalysis, vol. 4, No. 4, Aug. 1, 1965, pp. 446-453.
Film Extrusion Manual—Process, Materials, Properties, TAPPI Press, 1992, 16 pages.
Finch, "Reduction Studies on Supported Chromic Anhydride Catalysts," Journal of Catalysis, 43, 1976, pp. 111-121.
George Halsey, "Physical Adsorption on Non-Uniform Surfaces," Journal Chem. Phys., vol. 16, Mar. 9, 1948, pp. 931-937.
Hawley's Condensed Chemical Dictionary, Eleventh Edition, cover page, contents page, pp. 862-863, Van Nostrand Reinhold Company.
Hieber, C. A., et al., "Shear-rate-dependence modeling of polymer melt viscosity," Polymer Engineering and Science, Jul. 1992, pp. 931-938, vol. 32, No. 14.
Hieber, C. A., et al., "Some correlations involving the shear viscosity of polystyrene melts," Rheol Acta, 1989, pp. 321-332, vol. 28.
IUPAC Compendium of Chemical Terminology, 2nd Ed. 1997, pp. 1-1670.
Janzen, et al., "Diagnosing Long-Chain Branching in Polyethylene," Journal of Mol. Struct., 485/486, 1999, pp. 569-584.
Kohler, et al., "Infrared Spectroscopic Characterization of Chromium Carbonyl Species Formed by Ultraviolet Photoreduction of Silica-Supported Chromium(VI) in Carbon Monoxide," J. Phys. Chem. 1994, 98, pp. 4336-4342.
Max P McDaniel: "Review of Phillips Chromium Catalyst for Ethylene Polymerization (Chapter 10)" In: "Handbook of Transition Metal Polymerization Catalysts", Aug. 31, 2010 (Aug. 31, 2010), Wiley, US, XP055562084, ISBN: 978-1-119-24213-0 pp. 291-446.
McDaniel, et al., "The Activation of the Phillips Polymerization Catalyst; I. Influence of the Hydroxyl Population", J. Catalysis, vol. 82, No. 1, Jul. 1, 1983, pp. 98-109.
Milas, N .A., The hydroxylation of unsaturated substances. III. The use of vanadium pentoxide and chromium trioxide as Catalysts of hydroxylation, The Journal of the American Chemical Society, vol. 59, No. 11, pp. 2342-2344 (Year: 1937).
Milas, N.A. et al., The hydroxylation of unsaturated substances. IV. The catalytic hydroxylation of unsaturated hydrocarbons, The Journal of the American Chemical Society, vol. 59, No. 11, pp. 2345-2347 (Year: 1937).
Mino, et al., "Photoinduced Ethylene Polymerization on the CrVI/SiO2 Phillips Catalyst," J. Phys. Chem. C 2019, 123, 13 pp. 8145-8152.
Modern Plastics Encyclopedia, Mid-Nov. 1995 Issue, vol. 72, No. 12, 3 pages.
Schwerdtfeger, E., et al., Reduction of Cr(VI) polymerization catalysts by non-olefinic hydrocarbons, Applied Catalysis A: General, 423-424, pp. 91-99 (Year: 2012).
Shiliang Zhang, et al.; "Ethylene/1-Hexene Copolymerization with a Novel SiO 2-Supported Inorganic and Organic Hybrid Chromium-based Catalyst," Macromolecular Reaction Engineering, vol. 7, No. 6, Apr. 10, 2013, pp. 254-266.
Weckhuysen et al., "Alkane dehydrogenation over supported chromium oxide catalysts," Catalysis Today 51 (1999) pp. 223-232.
Welch, et al., "The Activation of the Phillips Polymerization Catalyst; II. Activation by Reduction-Reoxidation", J Catalysis, vol. 82, No. 1, Jul. 1, 1983, pp. 110-117.
Official Action issued in corresponding Russian Application No. 2021106564 dated Mar. 2, 2023, 5 pp.
Office Action issued in corresponding EP application No. 19783394.0 dated Feb. 28, 2023, 6 pp.
Search Report issued in related Chinese Application No. 2020800649970, dated Sep. 23, 2022, 2 pp.
Form PTO-892 issued in corresponding U.S. Appl. No. 17/470,066 dated Apr. 6, 2023, 1 pp.
Search Report issued in corresponding Russian Application No. 2021106564, dated Jun. 29, 2023, 2 pp.
Partial Search Report issued in corresponding EP Application No. 23167372.4, Jun. 30, 2023, 2 pp.
Alexander Kurek, et al, "Mesoporous Silica Supported Multiple Single-Site Catalysts and Polyethylene Reactor Blends with Tailor-Made Trimodal and Ultra-Broad Molecular Weight Distributions," Macromolecular Rapid Communications, vol. 31, No. 15, Jun. 22, 2010, pp. 1359-1363, XP055159901, ISSN: 1022-1336, DOI: 10.1002/marc.201000074.
First Office Action Summary issued in corresponding Chinese Application No. 2023102343503, mailed on Feb. 28, 2024, 2 pp.
Jian Hongliu, et al., "(a-Diimine) Nickel Covalently Supported Catalyst for Ethylene Polymerization," Petrochemical Technology, vol. 35, No. 4, pp. 329-333, Apr. 20, 2006.
Stephen Mecking, "Reactor Blending With Early/Late Transition Metal Catalyst Combinations in Ethylene Polymerization," Macromolecular Rapid Communications, Wiley-VCH, DE, vol. 20, No. 3, Mar. 1, 1999, pp. 139-143; XP000834998.

\* cited by examiner

1

MODIFIED SUPPORTED CHROMIUM CATALYSTS AND ETHYLENE-BASED POLYMERS PRODUCED THEREFROM

REFERENCE TO RELATED APPLICATION

This application is a divisional application of U.S. patent application Ser. No. 17/737,150, filed on May 5, 2022, which is a divisional application of U.S. patent application Ser. No. 16/571,228, filed on Sep. 16, 2019, now U.S. Pat. No. 11,376,575, which claims the benefit of U.S. Provisional Patent Application No. 62/732,020, filed on Sep. 17, 2018, the disclosures of which are incorporated herein by reference in their entirety.

FIELD OF THE INVENTION

The present disclosure generally relates to supported chromium catalysts and to ethylene polymers produced therefrom, and more particularly, relates to catalysts with a hydrocarbon group attached to the chromium and to the unique polymer features that result from using such catalysts in ethylene-based polymerizations.

BACKGROUND OF THE INVENTION

Chromium catalysts are among the most common catalysts used in olefin polymerizations. Supported chromium catalysts often are prepared by impregnating chromium onto a solid support, e.g., a solid oxide, followed by a calcining step. Generally, calcining is conducted in an oxidizing atmosphere, such that the chromium species within the supported chromium catalyst can be converted to hexavalent chromium.

The present invention is generally directed to reducing the supported chromium catalyst to an average oxidation state less than +6, and using the reduced catalyst to polymerize olefins, such as ethylene alone or with an alpha-olefin comonomer.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

A supported chromium catalyst is provided in one aspect of this invention, and in this aspect, the supported chromium catalyst can comprise a solid support, and from about 0.01 to about 20 wt. % chromium (based on the weight of the catalyst). The chromium has an average valence of less than or equal to about 5.25, and at least one bonding site on the chromium has a ligand characterized by one of the following formulas: —O-Hydrocarbon group or —O-Halogenated hydrocarbon group. The solid support can comprise a solid oxide (e.g., silica or silica-titania), a chemically-treated solid oxide (e.g., sulfated alumina or fluorided silica-coated alumina), or a zeolite (e.g., a medium pore zeolite or a large pore zeolite, often with a binder).

An ethylene polymer is provided in another aspect of this invention, and in this aspect, the ethylene polymer can be characterized by a Mw in a range from about 100,000 to about 400,000 g/mol, at least about 2 wt. % of the polymer having a molecular weight greater than 1,000,000 g/mol, and at least about 1.5 wt. % of the polymer having a molecular weight less than 1000 g/mol. Such ethylene polymers have relatively broad molecular weight distributions, often with ratios of Mw/Mn ranging from 30 to 80.

An ethylene homopolymer is provided in yet another aspect of this invention, and in this aspect, the ethylene homopolymer can have a number of methyl short chain branches (SCB's) in a range from about 3.5 to about 15 per 1000 total carbon atoms, a number of butyl SCB's of less than or equal to about 0.6 per 1000 total carbon atoms, and a ratio of Mw/Mn in a range from about 4 to about 10. The average molecular weight is not particularly limited, but typically Mw ranges from about 30,000 to about 200,000 g/mol. Due to the relatively high branch content, despite the lack of comonomer, the density can be below 0.945 g/cm$^3$, below 0.94 g/cm$^3$, or below 0.935 g/cm$^3$.

An ethylene polymer is provided in still another aspect of this invention, and in this aspect, the ethylene polymer can comprise a terminal branched alkane group, a terminal cyclic alkane group, a terminal aromatic group, or a terminal halogenated hydrocarbon group. Thus, the chain end can be a moiety not found in traditional ethylene homopolymerization and ethylene/α-olefin copolymerization. For instance, the terminal group or chain end can be a cyclic alkane group or an aromatic group, such as benzene or toluene.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

Figure 1:
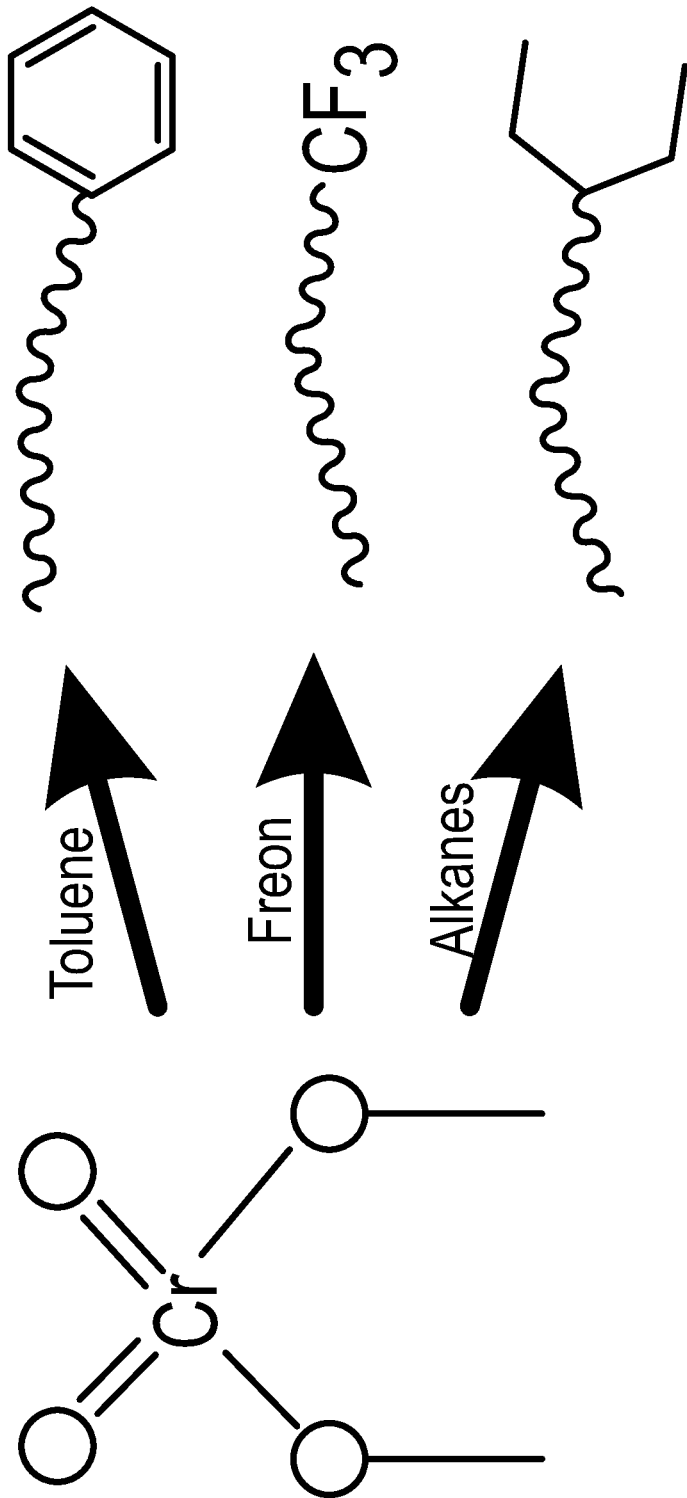
FIG. 1 presents an illustration of a chromium catalyst with a bonding site for a hydrocarbon group, and representative polymer chains incorporating the hydrocarbon group as a chain end.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2$^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the catalysts, compositions, processes, or methods described herein are contemplated with or without explicit description of the particular combination. Additionally, unless explicitly recited otherwise, any aspect or feature disclosed herein can be combined to describe inventive catalysts, compositions, processes, or methods consistent with the present disclosure.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "hydrocarbon" whenever used in this specification and claims refers to a group or compound containing only carbon and hydrogen, whether saturated or unsaturated. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). Non-limiting examples of hydrocarbons include alkanes (linear, branched, and cyclic), alkenes (olefins), and aromatics, among others.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

Unless otherwise specified, the term "substituted" when used to describe a group, for example, when referring to a substituted analog of a particular group, is intended to describe any non-hydrogen moiety that formally replaces a hydrogen in that group, and is intended to be non-limiting. Also, unless otherwise specified, a group or groups can also be referred to herein as "unsubstituted" or by equivalent terms such as "non-substituted," which refers to the original group in which a non-hydrogen moiety does not replace a hydrogen within that group. Moreover, unless otherwise specified, "substituted" is intended to be non-limiting and include inorganic substituents or organic substituents as understood by one of ordinary skill in the art.

The terms "contacting" and "combining" are used herein to describe catalysts, compositions, processes, and methods in which the materials or components are contacted or combined together in any order, in any manner, and for any length of time, unless otherwise specified. For example, the materials or components can be blended, mixed, slurried, dissolved, reacted, treated, impregnated, compounded, or otherwise contacted or combined in some other manner or by any suitable method or technique.

In this disclosure, while catalysts, compositions, processes, and methods are described in terms of "comprising" various components or steps, the catalysts, compositions, processes, and methods also can "consist essentially of" or "consist of" the various components or steps, unless stated otherwise.

The terms "a," "an," and "the" are intended to include plural alternatives, e.g., at least one. For instance, the disclosure of "a reductant," "a solid oxide," etc., is meant to encompass one, or mixtures or combinations of more than one, reductant, solid oxide, etc., unless otherwise specified.

The term "polymer" is used herein generically to include olefin homopolymers, copolymers, terpolymers, and the like, as well as alloys and blends thereof. The term "polymer" also includes impact, block, graft, random, and alternating copolymers. A copolymer can be derived from an olefin monomer and one olefin comonomer, while a terpolymer can be derived from an olefin monomer and two olefin comonomers. Accordingly, "polymer" encompasses copolymers and terpolymers. Similarly, the scope of the term "polymerization" includes homopolymerization, copolymerization, and terpolymerization. Therefore, an ethylene polymer would include ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an ethylene copolymer can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, if present and unless stated otherwise, and such configurations can include isotactic, syndiotactic, and random symmetries.

Herein, ethylene polymers also encompass ethylene-based polymers having non-traditional terminal groups or chain ends. Traditional terminal groups or chain ends include those that typically result (e.g., saturated methyl chain ends, vinyl chain ends) from the polymerization of ethylene, either alone or with alpha-olefin comonomers, such as 1-butene, 1-hexene, and 1-octene. Non-traditional terminal groups or chain ends encompassed herein can include various branched alkane, cyclic alkane, aromatic, and halogenated hydrocarbon groups.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, when a chemical compound having a certain number of carbon atoms is disclosed or claimed, the intent is to disclose or claim individually every possible number that such a range could encompass, consistent with the disclosure herein. For example, the disclosure of a $C_1$ to $C_{18}$ halogenated hydrocarbon group, or in alternative language, a halogenated hydrocarbon group having from 1 to 18 carbon atoms, as used herein, refers to a group that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ halogenated hydrocarbon group), and also including any combination of ranges between these two numbers (for example, a $C_2$ to $C_4$ and a $C_{12}$ to $C_{16}$ halogenated hydrocarbon group).

Similarly, another representative example follows for the amount of chromium contained in the supported catalyst. By a disclosure that the amount of chromium can be in a range from about 0.1 to about 15 wt. %, the intent is to recite that the amount of chromium can be any amount in the range and, for example, can be equal to about 0.1, about 0.2, about 0.3, about 0.4, about 0.5, about 0.6, about 0.7, about 0.8, about 0.9, about 1, about 2, about 3, about 4, about 5, about 6, about 7, about 8, about 9, about 10, about 11, about 12, about 13, about 14, or about 15 wt. %. Additionally, the amount of chromium can be within any range from about 0.1 to about 15 wt. % (for example, from about 0.1 to about 5 wt. %), and this also includes any combination of ranges between about 0.1 and about 15 wt. % (for example, the amount of chromium can be in a range from about 0.5 to about 2.5 wt. %, or from about 5 to about 15 wt. %). Further, in all instances, where "about" a particular value is disclosed, then that value itself is disclosed. Thus, the disclosure that the amount of chromium can be from about 0.1 to about 15 wt. % also discloses an amount of chromium from 0.1 to 15 wt. % (for example, from 0.1 to 5 wt. %), and this also includes any combination of ranges between 0.1 and 15 wt. % (for example, the amount of chromium can be in a range from 0.5 to 2.5 wt. %, or from 5 to 15 wt. %). Likewise, all other ranges disclosed herein should be interpreted in a manner similar to these examples.

The term "about" means that amounts, sizes, formulations, parameters, and other quantities and characteristics are not and need not be exact, but can be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, and often within 5% of the reported numerical value.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

DETAILED DESCRIPTION OF THE INVENTION

A hexavalent chromium catalyst can be converted into the divalent form by reduction in CO at elevated temperatures, for instance, at 200-800° C. The reduced catalyst then can be treated with an adjuvant hydrocarbon or halogenated hydrocarbon compound, which can be an alkane (linear or branched), a cycloalkane, or an aromatic. It is believed that the adjuvant compound forms a hydrocarbon-containing ligand on the modified catalyst, and when used in an olefin polymerization, the polymerization begins with and incorporates the hydrocarbon moiety from the modified catalyst as the first terminal group or chain end.

A hexavalent chromium catalyst can be reduced to an average valence of less than +6 in the presence of a suitable light source and hydrocarbon reductant. It is believed that the reductant compound forms a hydrocarbon-containing ligand on the modified catalyst, and when used in an olefin polymerization, the polymerization begins with and incorporates the hydrocarbon moiety from the modified catalyst as the first terminal group or chain end. FIG. 1 shows an illustration of the chromium catalyst with a bonding site for the hydrocarbon group, and representative polymer chains incorporating the hydrocarbon group as a chain end.

Ethylene Polymers

Generally, the polymers disclosed herein are ethylene-based polymers, or ethylene polymers, encompassing homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 1-pentene, 1-hexene, 1-heptene, 1-octene, and the like, or combinations thereof. In an aspect, the olefin comonomer can comprise a $C_3$-$C_{18}$ olefin; alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ α-olefin; alternatively, the olefin comonomer can comprise a $C_4$-$C_{10}$ α-olefin; alternatively, the olefin comonomer can comprise 1-butene, 1-hexene, 1-octene, or any combination thereof; or alternatively, the comonomer can comprise 1-hexene. Typically, the amount of the comonomer, based on the total weight of monomer (ethylene) and comonomer, can be in a range from about 0.01 to about 20 wt. %, from about 0.1 to about 10 wt. %, from about 0.5 to about 15 wt. %, from about 0.5 to about 8 wt. %, or from about 1 to about 15 wt. %.

In one aspect, the ethylene polymer of this invention can comprise an ethylene/α-olefin copolymer, while in another aspect, the ethylene polymer can comprise an ethylene homopolymer, and in yet another aspect, the ethylene polymer of this invention can comprise an ethylene/α-olefin copolymer and an ethylene homopolymer. For example, the ethylene polymer can comprise an ethylene/1-butene copolymer, an ethylene/1-hexene copolymer, an ethylene/1-octene copolymer, an ethylene homopolymer, or any combination thereof; alternatively, an ethylene homopolymer; alternatively, an ethylene/1-butene copolymer, an ethylene/1-hexene copolymer, an ethylene/1-octene copolymer, or any combination thereof; or alternatively, an ethylene/1-hexene copolymer.

An illustrative and non-limiting example of a first ethylene polymer (e.g., comprising an ethylene homopolymer and/or an ethylene copolymer) consistent with the present invention can have a Mw in a range from about 100,000 to about 400,000 g/mol, at least about 2 wt. % of the polymer having a molecular weight greater than 1,000,000 g/mol, and at least about 1.5 wt. % of the polymer having a molecular weight less than 1000 g/mol. Another illustrative and non-limiting example of a second ethylene homopolymer consistent with the present invention can have a number of methyl short chain branches (SCB's) in a range from about 3.5 to about 15 per 1000 total carbon atoms, a number of butyl SCB's of less than or equal to about 0.6 per 1000 total carbon atoms, and a ratio of Mw/Mn in a range from about 4 to about 10. Yet another illustrative and non-limiting example of a third ethylene polymer (e.g., comprising an ethylene homopolymer and/or an ethylene copolymer) consistent with the present invention can comprise a terminal branched alkane group, a terminal cyclic alkane group, a terminal aromatic group, or a terminal halogenated hydrocarbon group.

Referring now to the first ethylene polymer, which can be characterized by a Mw in a range from about 100,000 to about 400,000 g/mol, at least about 2 wt. % of the polymer having a molecular weight greater than 1,000,000 g/mol, and at least about 1.5 wt. % of the polymer having a molecular weight less than 1000 g/mol. This polymer, unexpectedly, has a relatively large fraction of the polymer with very low molecular weights (less than 1000 g/mol) in combination with a relatively large fraction of the polymer with very high molecular weights (greater than 1,000,000 g/mol).

In an aspect, the Mw of the first ethylene polymer often can range from about 100,000 to about 300,000 g/mol, from about 150,000 to about 400,000 g/mol, from about 200,000 to about 400,000 g/mol, or from about 200,000 to about 300,000 g/mol. Additionally or alternatively, the first ethylene polymer can have a Mn from about 3,000 to about 10,000 g/mol in one aspect, from about 4,000 to about 9,000 g/mol in another aspect, from about 4,000 to about 8,000 g/mol in another aspect, from about 4,000 to about 7,000 g/mol in yet another aspects, and from about 5,000 to about 6,000 g/mol in still another aspect. Additionally or alternatively, the first ethylene polymer can have a Mz in a range from about 1,500,000 to about 4,000,000 g/mol, from about 2,000,000 to about 3,500,000 g/mol, or from about 2,000,000 to about 3,000,000 g/mol. Additionally or alternatively, the first ethylene polymer can have a Mp (peak molecular weight) at a relatively low molecular weight, such as from about 10,000 to about 60,000 g/mol, from about 10,000 to about 50,000 g/mol, from about 10,000 to about 40,000 g/mol, or from about 15,000 to about 30,000 g/mol.

Consistent with the first polymer having a relatively large fraction of the polymer with very low molecular weights (less than 1000 g/mol) in combination with a relatively large fraction of the polymer with very high molecular weights (greater than 1,000,000 g/mol), the first ethylene polymer has a very broad molecular weight distribution, as reflected by the ratio of Mw/Mn. While not limited thereto, the first ethylene polymer can have a ratio of Mw/Mn from about 30 to about 80, from about 35 to about 75, from about 35 to about 60, from about 40 to about 55, or from about 45 to about 50. The ratio of Mz/Mw of the first ethylene polymer is not nearly as large, and typically falls in one or more of the following ranges: from about 6 to about 13, from about 8 to about 11, from about 8.5 to about 10.5, and/or from about 9 to about 10.

At least about 2 wt. % of the first ethylene polymer can have a molecular weight greater than 1,000,000 g/mol. Illustrative and non-limiting ranges for the amount of the first ethylene polymer having a molecular weight greater than 1,000,000 g/mol include from about 2 to about 10 wt. %, from about 3 to about 10 wt. %, from about 4 to about 9 wt. %, from about 5 to about 9 wt. %, or from about 5 to about 8 wt. %, and the like. Also indicative of the relatively large "high molecular weight fraction" of the first ethylene polymer is the highest molecular weight detected (using the analytical test described herein), which is at least about 5,000,000 g/mol, at least about 6,000,000 g/mol, at least about 7,000,000 g/mol, or at least about 8,000,000 g/mol.

At least about 1.5 wt. % of the first ethylene polymer can have a molecular weight less than 1000 g/mol. Illustrative and non-limiting ranges for the amount of the first ethylene polymer having a molecular weight less than 1000 g/mol include from about 1.5 to about 8 wt. %, from about 2 to about 7 wt. %, from about 3 to about 6 wt. %, from about 3.5 to about 5 wt. %, or from about 4 to about 4.5 wt. %, and the like. Also indicative of the relatively large "low molecular weight fraction" of the first ethylene polymer is the amount of the polymer having a molecular weight less than 3162 g/mol, which often ranges from about 8 to about 20 wt. %, from about 10 to about 20 wt. %, from about 12 to about 18 wt. %, from about 13 to about 17 wt. %, or from about 14 to about 16 wt. % of the polymer.

Notwithstanding the relatively large fraction of the polymer with very low molecular weights in combination with a relatively large fraction of the polymer with very high molecular weights, a majority of the polymer often resides in the 10,000 to 1,000,000 g/mol range of molecular weight. While not limited thereto, from about 53 to about 73 wt. %, from about 55 to about 70 wt. %, from about 58 to about 68 wt. %, or from about 61 to about 65 wt. %, of the first ethylene polymer has a molecular weight in the 10,000 to 1,000,000 g/mol range.

Referring now to the second ethylene polymer, in this case an ethylene homopolymer, which can be characterized by a number of methyl short chain branches (SCB's) in a range from about 3.5 to about 15 per 1000 total carbon atoms, a number of butyl SCB's of less than or equal to about 0.6 per 1000 total carbon atoms, and a ratio of Mw/Mn in a range from about 4 to about 10. This second ethylene homopolymer has a surprising combination of a relatively large amount of methyl branches along with a relatively small amount of butyl branches.

In some aspects, the number of methyl SCB's of the second ethylene homopolymer can range from about 3.5 to about 12, from about 3.5 to about 10.5, from about 4 to about 12, from about 4 to about 10, from about 4.5 to about 10, or from about 5 to about 10 methyl SCB's per 1000 total carbon atoms. Additionally or alternatively, the number of butyl SCB's of the homopolymer can be less than or equal to about 0.5, less than or equal to about 0.4, less than or equal to about 0.3, or less than or equal to about 0.2 butyl SCB's per 1000 total carbon atoms.

The molecular weight distribution of the second ethylene homopolymer, as reflected by the ratio of Mw/Mn, typically ranges from about 4 to about 10, but in some aspects, can range from about 4 to about 9, from about 4 to about 8.5, or from about 4 to about 8, while in other aspects, the ratio of Mw/Mn of the homopolymer ranges from about 4.5 to about 10, from about 4.5 to about 8.5, or from about 5 to about 9. The ratio of Mz/Mw of the ethylene homopolymer is not particularly limited, but often can range from about 2.5 to about 7; alternatively, from about 2.5 to about 6; alternatively, from about 3 to about 7; or alternatively, from about 3 to about 6.

The second ethylene homopolymer can encompass a broad range of molecular weights, such as having a Mw in a range from about 30,000 to about 200,000 g/mol in one aspect, from about 30,000 to about 140,000 g/mol in another aspect, from about 35,000 to about 150,000 g/mol in yet another aspect, and from about 40,000 to about 135,000 g/mol in still another aspect.

Unexpectedly, the homopolymer disclosed herein also can be characterized by a ratio of vinyl chain ends to saturated chain ends (vinyl/saturated) per 1000 total carbon atoms that is less than or equal to about 1. In further aspects, the vinyl/saturated ratio can be less than or equal to about 0.5; alternatively, less than or equal to about 0.3; or alternatively, less than or equal to about 0.1. While not being limited thereto, the homopolymer can further have a number of ethyl SCB's from about 0.8 to about 5, from about 1 to about 5, from about 0.8 to about 4, from about 1 to about 4, from about 0.8 to about 3.5, from about 1 to about 3.5, or from about 1.5 to about 3.5 ethyl SCB's per 1000 total carbon atoms.

The significant branching of the second ethylene homopolymer suppresses the density, and therefore, densities in the range of from about 0.93 to about 0.96 $g/cm^3$ are achievable.

Representative ranges for the homopolymer density include from about 0.93 to about 0.955 g/cm$^3$, from about 0.935 to about 0.955 g/cm$^3$, from about 0.935 to about 0.950 g/cm$^3$, from about 0.938 to about 0.948 g/cm$^3$, and the like.

Referring now to the third ethylene polymer, which can comprise a terminal branched alkane group, a terminal cyclic alkane group, a terminal aromatic group, or a terminal halogenated hydrocarbon group. Thus, instead of traditional methyl and vinyl chain ends, the third ethylene polymer—unexpectedly—can contain a chain end that is a branched alkane group, a cyclic alkane group, an aromatic group, or a halogenated hydrocarbon group. The chemical "groups" described herein—such as alkane groups and aromatic groups—are general terms to encompass a variety of groups in which any number ("one or more") hydrogen atoms are removed, as necessary for the situation and to conform with the rules of chemical valence. For instance, an illustrative cyclic alkane group is a cyclohexane group, which encompasses moieties in which any number of hydrogen atoms are removed from a cyclohexane, such as a cyclohexyl group.

The bulk polymer is not particularly limited, and in one aspect, the third ethylene polymer can comprise an ethylene homopolymer, while in another aspect, the third ethylene polymer can comprise an ethylene/α-olefin copolymer, and in yet another aspect, the third ethylene polymer can comprise an ethylene/1-butene copolymer, an ethylene/1-hexene copolymer, and/or an ethylene/1-octene copolymer, and in still another aspect, the third ethylene polymer can comprise an ethylene/1-hexene copolymer.

The branched alkane group which can be the terminal group or the chain end is not particularly limited, and can be any suitable carbon number branched alkane group, such as a $C_4$ to $C_{36}$ branched alkane group, a $C_4$ to $C_{18}$ branched alkane group, a $C_{10}$ to $C_{36}$ branched alkane group, or a $C_{10}$ to $C_{36}$ branched alkane group. Illustrative branched alkane groups include neopentane, iso-pentane, iso-octane, and the like.

Likewise, the cyclic alkane group is not particularly limited, and any carbon number cyclic alkane group can be the terminal group or chain end of the third ethylene polymer. For instance, $C_4$ to $C_{36}$ cyclic alkane groups, $C_4$ to $C_{18}$ cyclic alkane groups, $C_6$ to $C_{18}$ cyclic alkane groups, and $C_6$ to $C_{10}$ cyclic alkane groups are contemplated herein, and specific non-limiting examples include cyclobutane, cyclopentane, cyclohexane, cyclooctane, and the like.

Similarly, the aromatic group which can be the terminal group or the chain end is not particularly limited, and any suitable carbon number aromatic group is encompassed herein. Representative non-limiting examples include a benzene group, a toluene group, an ethylbenzene group, a xylene group, a mesitylene group, and the like.

Additionally, the halogenated hydrocarbon group is not particularly limited, and any carbon number halogenated hydrocarbon group can be the terminal group or chain end of the third ethylene polymer. For instance, $C_1$ to $C_{36}$ halogenated hydrocarbon groups, $C_1$ to $C_{18}$ halogenated hydrocarbon groups, $C_1$ to $C_{12}$ halogenated hydrocarbon groups, or $C_1$ to $C_8$ halogenated hydrocarbon groups can present at the terminal end of the third ethylene polymer, and a non-limiting example of such halogenated hydrocarbon groups is tetrafluoroethane.

If not already specified, the first ethylene polymer, the second ethylene polymer, and the third ethylene polymer consistent with the present invention also can have any of the polymer properties listed below and in any combination.

Ethylene polymers (e.g., ethylene homopolymers and/or copolymers) produced in accordance with some aspects of this invention generally can have a melt index (MI) from 0 to about 100 g/10 min. Melt indices in the range from 0 to about 50 g/10 min, from 0 to about 25 g/10 min, or from 0 to about 10 g/10 min, are contemplated in other aspects of this invention. For example, a polymer of the present invention can have a melt index in a range from 0 to about 5, from 0 to about 3, from 0 to about 1, or from 0 to about 0.5 g/10 min.

Ethylene polymers produced in accordance with some aspects of this invention can have a high load melt index (HLMI) of less than or equal to about 200, less than or equal to about 150, or less than or equal to about 100 g/10 min. Suitable ranges for the HLMI can include, but are not limited to, from 0 to about 150, from about 2 to about 120, from about 1 to about 100, from about 1 to about 80, from about 2 to about 80, from about 4 to about 60, from about 8 to about 60, from about 1 to about 50, from about 4 to about 50, from about 3 to about 40, or from about 6 to about 40 g/10 min.

The densities of ethylene polymers produced using the chromium catalysts and the processes disclosed herein often are greater than or equal to about 0.89 g/cm$^3$. In one aspect of this invention, the density of the olefin polymer can be in a range from about 0.89 to about 0.96 g/cm$^3$. Yet, in another aspect, the density can be in a range from about 0.91 to about 0.95 g/cm$^3$, such as, for example, from about 0.91 to about 0.94 g/cm$^3$, from about 0.92 to about 0.955 g/cm$^3$, or from about 0.93 to about 0.955 g/cm$^3$.

In an aspect, ethylene polymers described herein can have a weight-average molecular weight (Mw) in a range from about 50,000 to about 2,000,000, from about 50,000 to about 1,000,000, from about 50,000 to about 700,000, from about 75,000 to about 500,000, from about 100,000 to about 500,000, from about 100,000 to about 400,000, or from about 150,000 to about 300,000 g/mol. Additionally or alternatively, ethylene polymers described herein can have a number-average molecular weight (Mn) in a range from about 2,000 to about 250,000, from about 2,000 to about 100,000, from about 2,000 to about 50,000, from about 5,000 to about 200,000, from about 5,000 to about 150,000, or from about 5,000 to about 50,000 g/mol. In another aspect, ethylene polymers described herein can have a Mn in a range from about 10,000 to about 100,000, from about 10,000 to about 75,000, from about 25,000 to about 150,000, or from about 50,000 to about 150,000 g/mol.

Ethylene copolymers, for example, produced using the polymerization processes and catalysts described herein can, in some aspects, have a decreasing comonomer distribution, generally, the higher molecular weight components of the polymer have less comonomer incorporation than the lower molecular weight components. In one aspect, the number of short chain branches (SCB's) per 1000 total carbon atoms of the polymer can be less at Mw than at Mn. In another aspect, the number of SCB's per 1000 total carbon atoms of the polymer can be less at Mz than at Mw. In yet another aspect, the number of SCB's per 1000 total carbon atoms of the polymer can be less at Mz than at Mn.

The first ethylene polymer, the second ethylene polymer, and the third ethylene polymer can be produced with chromium-based catalysts. Therefore, these ethylene polymers can contain no measurable amount of nickel or iron (catalyst residue), i.e., less than 0.1 ppm by weight. In some aspects, the ethylene polymer can contain, independently, less than 0.08 ppm, less than 0.05 ppm, or less than 0.03 ppm, of nickel and iron. Moreover, metallocene and Ziegler-Natta catalyst systems are not required. Therefore, the ethylene polymers can contain no measurable amount of titanium, zirconium, and hafnium (catalyst residue), i.e., less than 0.1 ppm by weight. In some aspects, the ethylene polymer can contain, independently, less than 0.08 ppm, less than 0.05 ppm, or less than 0.03 ppm, of titanium, zirconium, and hafnium.

Articles of manufacture can be formed from, and/or can comprise, the first, second, and third ethylene polymers of this invention and, accordingly, are encompassed herein. For example, articles which can comprise the polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of the ethylene polymers described herein, and the article of manufacture can be or can comprise a pipe, a molded product (e.g., blow molded), or a film (e.g., a blown film). Typical additives that can be present in the ethylene polymer and/or the article of manufacture include antioxidants, acid scavengers, antiblock additives, slip additives, colorants, fillers, processing aids, UV inhibitors, and the like, as well as combinations thereof.

Chromium Catalysts

Aspects of this invention are directed to supported chromium catalysts, and such catalysts can comprise a solid support, and from about 0.01 to about 20 wt. % chromium, based on the weight of the catalyst. The chromium can have an average valence of less than or equal to about 5.25, and at least one bonding site on the chromium can have a ligand characterized by one of the following formulas: —O-Hydrocarbon group or —O-Halogenated hydrocarbon group.

Various solid supports can be used for the supported chromium catalyst, such as conventional solid oxides and zeolites. Generally, the solid oxide can comprise oxygen and one or more elements selected from Group 2, 3, 4, 5, 6, 7, 8, 9, 10, 11, 12, 13, 14, or 15 of the periodic table, or comprise oxygen and one or more elements selected from the lanthanide or actinide elements (See: Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For example, the solid oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr. Illustrative examples of solid oxide materials or compounds that can be used as solid support can include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof.

The solid oxide can encompass oxide materials such as silica, "mixed oxide" compounds thereof such as silica-titania, and combinations or mixtures of more than one solid oxide material. Mixed oxides such as silica-titania can be single or multiple chemical phases with more than one metal combined with oxygen to form the solid oxide. Examples of mixed oxides that can be used as solid oxide include, but are not limited to, silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, and the like, or a combination thereof. In some aspects, the solid support can comprise silica, silica-alumina, silica-coated alumina, silica-titania, silica-titania-magnesia, silica-zirconia, silica-magnesia, silica-boria, aluminophosphate-silica, and the like, or any combination thereof. Silica-coated aluminas are encompassed herein; such oxide materials are described in, for example, U.S. Pat. Nos. 7,884,163 and 9,023,959, incorporated herein by reference in their entirety.

The percentage of each oxide in a mixed oxide can vary depending upon the respective oxide materials. As an example, a silica-alumina (or silica-coated alumina) typically has an alumina content from 5 wt. % to 95 wt. %. According to one aspect, the alumina content of the silica-alumina (or silica-coated alumina) can be from 5 wt. % alumina 50 wt. % alumina, or from 8 wt. % to 30 wt. % alumina. In another aspect, high alumina content silica-aluminas (or silica-coated aluminas) can be employed, in which the alumina content of these materials typically ranges from 60 wt. % alumina to 90 wt. % alumina, or from 65 wt. % alumina to 80 wt. % alumina.

In one aspect, the solid oxide can comprise silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, or a combination thereof; alternatively, silica-alumina; alternatively, silica-coated alumina; alternatively, silica-titania; alternatively, silica-zirconia; alternatively, alumina-titania; alternatively, alumina-zirconia; alternatively, zinc-aluminate; alternatively, alumina-boria; alternatively, silica-boria; alternatively, aluminum phosphate; alternatively, aluminophosphate; alternatively, aluminophosphate-silica; or alternatively, titania-zirconia.

In another aspect, the solid oxide can comprise silica, alumina, titania, thoria, stania, zirconia, magnesia, boria, zinc oxide, a mixed oxide thereof, or any mixture thereof. In yet another aspect, the solid support can comprise silica, alumina, titania, or a combination thereof; alternatively, silica; alternatively, alumina; alternatively, titania; alternatively, zirconia; alternatively, magnesia; alternatively, boria; or alternatively, zinc oxide. In still another aspect, the solid oxide can comprise silica, alumina, silica-alumina, silica-coated alumina, aluminum phosphate, aluminophosphate, heteropolytungstate, titania, zirconia, magnesia, boria, zinc oxide, silica-titania, silica-yttria, silica-zirconia, alumina-titania, alumina-zirconia, zinc-aluminate, alumina-boria, silica-boria, aluminophosphate-silica, titania-zirconia, and the like, or any combination thereof.

Consistent with certain aspects of this invention, the catalyst can comprise a chemically-treated solid oxide as the support, and where the chemically-treated solid oxide comprises a solid oxide (any solid oxide disclosed herein) treated with an electron-withdrawing anion (any electron withdrawing anion disclosed herein). The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, tungstate, molybdate, and the like, including mixtures and combinations thereof. In addition, other ionic or non-ionic compounds that serve as sources for these electron-withdrawing anions also can be employed.

It is contemplated that the electron-withdrawing anion can be, or can comprise, fluoride, chloride, bromide, phosphate, triflate, bisulfate, or sulfate, and the like, or any combination thereof, in some aspects provided herein. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Yet, in other aspects, the electron-withdrawing anion can comprise fluoride and/or sulfate.

The chemically-treated solid oxide generally can contain from about 1 wt. % to about 30 wt. % of the electron-withdrawing anion, based on the weight of the chemically-treated solid oxide. In particular aspects provided herein, the chemically-treated solid oxide can contain from about 1 to about 20 wt. %, from about 2 wt. % to about 20 wt. %, from about 3 wt. % to about 20 wt. %, from about 2 wt. % to about 15 wt. %, from about 3 wt. % to about 15 wt. %, from about 3 wt. % to about 12 wt. %, or from about 4 wt. % to about 10 wt. %, of the electron-withdrawing anion, based on the total weight of the chemically-treated solid oxide.

In an aspect, the chemically-treated solid oxide can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, and the like, as well as any mixture or combination thereof.

In another aspect, the chemically-treated solid oxide employed in the catalysts and processes described herein can be, or can comprise, a fluorided solid oxide and/or a sulfated solid oxide, non-limiting examples of which can include fluorided alumina, sulfated alumina, fluorided silica-alumina, sulfated silica-alumina, fluorided silica-zirconia, fluorided silica-coated alumina, sulfated silica-coated alumina, and the like, as well as combinations thereof. Additional information on chemically-treated solid oxide can be found in, for instance, U.S. Pat. Nos. 7,294,599, 7,601,665, 7,884, 163, 8,309,485, 8,623,973, and 8,703,886, which are incorporated herein by reference in their entirety.

Representative examples of supported chromium catalysts (in which a solid oxide is the support) include, but are not limited to, chromium/silica, chromium/silica-titania, chromium/silica-titania-magnesia, chromium/silica-alumina, chromium/silica-coated alumina, chromium/aluminophosphate, chromium/alumina, chromium/alumina borate, and the like, or any combination thereof. In one aspect, for instance, the supported chromium catalyst can comprise chromium/silica, while in another aspect, the supported chromium catalyst can comprise chromium/silica-titania, and in yet another aspect, the supported chromium catalyst can comprise chromium/silica-alumina and/or chromium/silica-coated alumina. In circumstances in which the supported chromium catalyst comprises chromium/silica-titania, any suitable amount of titanium can be present, including from about 0.1 to about 20 wt. %, from about 0.5 to about 15 wt. %, from about 1 to about 10 wt. %, or from about 1 to about 6 wt. % titanium, based on the total weight of the catalyst.

Representative examples of supported chromium catalysts (in which a chemically-treated solid oxide is the support) include, but are not limited to, chromium/sulfated alumina, chromium/fluorided alumina, chromium/fluorided silica-alumina, chromium/fluorided silica-coated alumina, and the like, as well as combinations thereof.

Consistent with certain aspects of this invention, the supported chromium catalyst can comprise a zeolite as the support, i.e., a chromium supported zeolite. Any suitable zeolite can be used, for instance, large pore and medium pore zeolites. Large pore zeolites often have average pore diameters in a range of from about 7 Å to about 12 Å, and non-limiting examples of large pore zeolites include L-zeolite, Y-zeolite, mordenite, omega zeolite, beta zeolite, and the like. Medium pore zeolites often have average pore diameters in a range of from about 5 Å to about 7 Å. Combinations of zeolitic supports can be used.

Additional representative examples of zeolites that can be used in the supported catalyst include, for instance, a ZSM-5 zeolite, a ZSM-11 zeolite, a EU-1 zeolite, a ZSM-23 zeolite, a ZSM-57 zeolite, an ALPO4-11 zeolite, an ALPO4-41 zeolite, a Ferrierite framework type zeolite, and the like, or any combination thereof.

In the catalyst, the zeolite can be bound with a support matrix (or binder), non-limiting examples of which can include silica, alumina, magnesia, boria, titania, zirconia, various clays, and the like, including mixed oxides thereof, as well as mixtures thereof. For example, the catalyst support can comprise a binder comprising alumina, silica, a mixed oxide thereof, or a mixture thereof. The zeolite can be bound with the binder using any method known in the art. While not being limited thereto, the catalyst can comprise a zeolite and from about 3 wt. % to about 35 wt. % binder; alternatively, from about 5 wt. % to about 30 wt. % binder; or alternatively, from about 10 wt. % to about 30 wt. % binder. These weight percentages are based on the total weight of the catalyst.

The amount of chromium in the supported chromium catalyst also is not particularly limited. However, the amount of chromium in the supported chromium catalyst typically ranges from about 0.01 to about 20 wt. %; alternatively, from about 0.01 to about 10 wt. %; alternatively, from about 0.05 to about 15 wt. %; alternatively, from about 0.1 to about 15 wt. %; alternatively, from about 0.2 to about 10 wt. %; alternatively, from about 0.1 to about 5 wt. %; or alternatively, from about 0.5 to about 2.5 wt. %. These weight percentages are based on the amount of chromium relative to the total weight of the catalyst.

Likewise, the amount of chromium in an oxidation state of +5 or less in catalyst is not particularly limited, and can fall within the same ranges. Thus, the chromium catalyst can contain from about 0.01 to about 20 wt. %, from about 0.01 to about 10 wt. %, from about 0.05 to about 15 wt. %, from about 0.1 to about 15 wt. %, from about 0.2 to about 10 wt. %, from about 0.1 to about 5 wt. %, or from about 0.5 to about 2.5 wt. % of chromium in an oxidation state of +5 or less, based on the total weight of the catalyst. Traditional chromium (VI) catalysts often will have an orange, yellow, or tan color, while catalysts with chromium in reduced oxidation states often will have a green, blue, gray, or black color.

Generally, in the supported chromium catalyst, less than or equal to about 75 wt. % of the chromium can be in the hexavalent state in one aspect, while less than or equal to about 50 wt. % of the chromium can be in the hexavalent state in another aspect, and less than or equal to about 40 wt. % of the chromium can be in the hexavalent state in yet another aspect, and less than or equal to about 30 wt. % of the chromium can be in the hexavalent state in still another aspect. These values are based on the total amount of chromium in the catalyst.

Additionally or alternatively, the chromium in the supported chromium catalyst can be characterized by an average valence of less than or equal to about 5.25. More often, the catalyst contains chromium having an average valence of less than or equal to about 5; alternatively, an average valence of less than or equal to about 4.75; alternatively, an average valence of less than or equal to about 4.5; alternatively, an average valence of less than or equal to about 4.25; or alternatively, an average valence of less than or equal to about 4.

Additionally or alternatively, the molar ratio of the hydrocarbon group (i.e., hydrocarbon or halogenated hydrocarbon) to chromium in the supported catalyst often ranges from about 0.25:1 to about 2:1, while not being limited thereto. For instance, in some aspects, the molar ratio of the hydrocarbon group to chromium can fall in a range from about 0.5:1 to about 2:1, from about 0.5:1 to about 1.5:1, from about 0.75:1 to about 1.75:1, or from about 0.75:1 to about 1.25:1, and the like.

The total pore volume of the supported chromium catalyst also is not particularly limited. For instance, the supported chromium catalyst can have a total pore volume in a range from about 0.1 to about 5 mL/g, from about 0.15 to about 5 mL/g, from about 0.1 to about 3 mL/g, from about 0.5 to about 2.5 mL/g, or from about 0.15 to about 2 mL/g. Likewise, the surface area of the supported chromium catalyst is not limited to any particular range. Generally, however, the supported chromium catalyst can have a BET surface area in a range from about 50 to about 2000 m$^2$/g, from about 50 to about 700 m$^2$/g, from about 50 to about 400 m$^2$/g, from about 100 to about 1200 m$^2$/g, from about 150 to about 525 m$^2$/g, or from about 200 to about 400 m$^2$/g. BET surface areas are determined using the BET nitrogen adsorption method of Brunaur et al., *J. Am. Chem. Soc.*, 60, 309 (1938). Total pore volumes are determined in accordance with Halsey, G. D., *J. Chem. Phys.* (1948), 16, pp. 931.

The supported chromium catalyst can have any suitable shape or form, and such can depend on the type of process that is employed to use the catalyst (e.g., loop slurry and fluidized bed for polymerization, and other processes for non-polymerization processes, such as fixed bed). Illustrative and non-limiting shapes and forms include powder, round or spherical (e.g., a sphere), ellipsoidal, pellet, bead, cylinder, granule (e.g., regular and/or irregular), trilobe, quadralobe, ring, wagon wheel, monolith, and the like, as well as any combination thereof. Accordingly, various methods can be utilized to prepare the catalyst particles, including, for example, extrusion, spray drying, pelletizing, marumerizing, spherodizing, agglomeration, oil drop, and the like, as well as combinations thereof.

In some aspects, the supported chromium catalyst can have a relatively small particle size, in which representative ranges for the average (d50) particle size of the supported chromium catalyst can include from about 10 to about 500 microns, from about 25 to about 250 microns, from about 20 to about 100 microns, from about 40 to about 160 microns, or from about 40 to about 120 microns. The d50 particle size, or median or average particle size, refers to the particle size for which 50% of the sample has a smaller size and 50% of the sample has a larger size, and is determined using laser diffraction in accordance with ISO 13320.

In other aspects, the supported chromium catalyst can be in the form of pellets or beads—and the like—having an average size ranging from about 1/16 inch to about 1/2 inch, or from about 1/8 inch to about 1/4 inch. As noted above, the size of the catalyst particles can be varied to suit the particular process that is utilizing the chromium catalyst.

A variety of hydrocarbons and halogenated hydrocarbons can be part of a ligand bound to the chromium in a —O-Hydrocarbon group or —O-Halogenated hydrocarbon group, inclusive of saturated aliphatic hydrocarbon groups, unsaturated aliphatic hydrocarbon groups, linear aliphatic hydrocarbon groups, branched aliphatic hydrocarbon groups, and cyclic aliphatic hydrocarbon groups. Thus, the hydrocarbon group can be a linear alkane group, a branched alkane group, or a cyclic alkane group, as well as halogenated versions thereof. Alternatively, the hydrocarbon group can be an aromatic group, such as a benzene group, a toluene group, and the like, as well as substituted versions and/or halogenated versions thereof. Hence, in one aspect, an alkoxy group can be bonded to the chromium, while in another aspect, an aryloxy group can be bonded to the chromium.

Any suitable carbon number hydrocarbon group can be used, such that the hydrocarbon group can be a $C_n$ hydrocarbon group. While not being limited thereto, the integer n can range from 1 to 36 in one aspect, from 1 to 18 in another aspect, from 1 to 12 in yet another aspect, and from 1 to 8 in still another aspect. Therefore, the hydrocarbon group (or halogenated hydrocarbon group) can be any suitable carbon number alkane group, for instance, a $C_1$ to $C_{36}$ alkane group; alternatively, a $C_1$ to $C_{18}$ alkane group; alternatively, a $C_1$ to $C_{12}$ alkane group; or alternatively, a $C_1$ to $C_8$ alkane group, and analogous halogenated alkane groups.

Likewise, the hydrocarbon group (or halogenated hydrocarbon group) can be any suitable carbon number aromatic group, for instance, a $C_6$ to $C_{36}$ aromatic group; alternatively, a $C_6$ to $C_{18}$ aromatic group; alternatively, a $C_6$ to $C_{12}$ aromatic group; or alternatively, a $C_6$ to $C_8$ aromatic group, and analogous halogenated aromatic groups.

Illustrative examples of alkane and aromatic hydrocarbon groups can include a methane group, an ethane group, a propane group, a butane (e.g., n-butane or isobutane) group, a pentane (e.g., n-pentane, neopentane, or isopentane) group, a hexane group, a heptane group, an octane group, a nonane group, a decane group, an undecane group, a dodecane group, a tridecane group, a tetradecane group, a pentadecane group, a hexadecane group, a heptadecane group, an octadecane group, a benzene group, a toluene group, an ethylbenzene group, a xylene group, a mesitylene group, and the like, as well as halogenated versions thereof.

EXAMPLES

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

Melt index (MI, g/10 min) was determined in accordance with ASTM D1238 at 190° C. with a 2.16 kg weight, $I_{10}$ (g/10 min) was determined in accordance with ASTM D1238 at 190° C. with a 10 kg weight, and high load melt index (HLMI, g/10 min) was determined in accordance with ASTM D1238 at 190° C. with a 21.6 kg weight. BET surface areas can be determined using the BET nitrogen adsorption method of Brunaur et al., *J. Am. Chem. Soc.*, 60, 309 (1938). Total pore volumes can be determined in accordance with Halsey, G. D., *J. Chem. Phys.* (1948), 16, pp. 931. The d50 particle size, or median or average particle size, refers to the particle size for which 50% of the sample has a smaller size and 50% of the sample has a larger size, and can be determined using laser diffraction in accordance with ISO 13320.

In these examples, supported chromium catalysts comprising hexavalent chromium species were irradiated under UV-visible light in the presence of various reductants and under various treatment conditions. Prior to irradiation, the supported chromium catalysts were calcined at the specified temperature in dry air (an oxidizing atmosphere) in a fluidized bed for three hours, in order to convert the chromium species to their respective hexavalent oxidation state.

Unless otherwise specified, for each of the examples provided below, about two grams of the supported catalyst were first charged to an air-tight glass container at 25° C., optionally in the presence of a reductant. The glass container was then exposed to light as noted in Tables I-IV below. For examples where the glass container was exposed to sunlight, the container was taken outside and placed in direct sunlight, slowly rotating the container to ensure even exposure of the supported chromium catalyst mixture. For examples where the glass container was exposed to artificial light, the sample was placed in a box containing a fluorescent light emitting light in the UV-Vis spectrum. Examples not exposed to light were stored under dim lighting, or wrapped in foil to ensure no light entered the glass container. Reduction of the supported chromium catalysts was monitored by the presence of a color change. For each catalyst, the starting hexavalent supported chromium catalyst had an orange color which darkened significantly upon exposing the catalyst to light in the presence of a reductant, indicating reduction of the supported chromium catalyst starting material.

The reduced chromium catalysts, prepared as described above, were used in polymerization experiments conducted in a 2-L stainless-steel autoclave reactor containing 1.2 L of isobutane as a diluent. The polymerization reactions were conducted in the dark, and ethylene was fed on demand to maintain a reactor pressure of 550 psig. The reactor was maintained at the 105° C. (unless otherwise specified) throughout the experiment by an automated heating-cooling system. For copolymerization experiments, 1-hexene was flushed in with the initial ethylene charge. At the end of each experiment, the resulting polymer was dried at 60° C. under reduced pressure.

Examples 1-20

Examples 1-20 employed a supported chromium catalyst comprising silica-titania (2.5 wt. % Ti and 1.0 wt. % Cr). The Cr/silica-titania catalyst had a BET surface area of 500 m²/g, a pore volume of 2.5 mL/g, and an average particle size of 130 μm. The Cr/silica-titania catalysts were calcined at 850° C. (except as indicated otherwise) in dry air (an oxidizing atmosphere) in order to convert the respective chromium species to the hexavalent oxidation state. Tables I-II summarize the various catalyst reductions, catalyst productivity (grams of polyethylene per gram of catalyst), catalyst activity (grams of polyethylene per gram of catalyst per hour), and resultant polymer HLMI, $I_{10}$, and MI (g/10 min).

Comparative Examples 1-6 describe attempts to reduce the hexavalent chromium present on the Cr/silica-titania catalysts without exposing the catalyst to light in the presence of a reductant. As shown in Examples 1-2, when no reductant was present, the catalyst was unaffected by light (orange). In contrast, Examples 9-20 each underwent a color change following exposure to light after as little as 10 minutes in the presence of various reductants, the color change persisting after being removed from the light. Unexpectedly, when a reductant was present, even short exposures of light resulted in a color change, indicating reduction of the chromium to a lower valence chromium species. In fact, the catalyst activity and melt index potential of the catalysts were improved by relatively short exposures to light, as shown by Inventive Examples 9, 13, and 17.

In addition to reductions with ethylene, the reduction step was surprisingly effective for hydrocarbons that are relatively difficult to oxidize, such as methane and benzene. Examples 3-6 demonstrate the difficulty of reducing Cr(VI) catalysts in the presence of the hydrocarbon methane using conventional methods. In Examples 3-6, methane was passed through the catalysts in a fluidized bed (without light), and required heating to 350° C. and above (Examples 4-6) before a color change was observed. In contrast, and unexpectedly, exposing samples of the catalyst to sunlight in the presence of methane, without heating, induced a color change in the catalyst mixture within minutes (Example 13). Even more surprising, reduction in the presence of methane by the inventive method was not accompanied by a significant loss in catalyst activity and melt index potential, indicating that the catalyst produced in the presence of light is fundamentally distinct from that produced by conventional methods. Note the higher catalyst activities and melt index properties of Examples 13-14 as compared to Examples 3-6.

Examples 15-17 provide additional examples of reductions using compounds that are traditionally poor reductants, including tetrafluoroethane and benzene. Each example demonstrated a distinct and quick color change upon exposure to light. The use of benzene resulted in increased catalyst activity and comparable melt index properties to Comparative Examples 1-2.

Inventive Examples 18-19 were conducted using $H_2$ as the reductant. Surprisingly, the reduction produced an active catalyst within minutes having increased MI potential and comparable activity, relative to the Comparative Example 7. This result is unexpected, particularly because thermal reduction in hydrogen typically results in a relatively inactive catalyst with low MI potential.

Comparative Example 8 is provided as direct comparison for Example 20, where the Cr/silica-titania catalyst was calcined at slightly elevated temperatures (871° C.), prior to being reduced in the presence of methane for 6 hr. The resulting reduced Cr/silica-titania catalysts were used in an ethylene/1-hexene copolymerization reaction, and surprisingly, both the catalyst activity and melt index properties of the catalyst reduced in the presence of light were higher than the Cr(VI)/silica-titania catalyst of Comparative Example 8.

TABLE 1

Comparative Examples 1-8 using Cr/silica-titania without light reduction

| Example | Reductant | Treatment | Color | Productivity (gPE/gCat) | Activity (g/g/h) | HLMI (g/10 min) | $I_{10}$ (g/10 min) | MI (g/10 min) |
|---|---|---|---|---|---|---|---|---|
| 1 | None | None, 1 week | orange | 2315 | 3307 | 110 | 27.2 | 1.97 |
| 2 | None | light, 1 week | orange | 2434 | 3319 | 96 | 23.7 | 1.75 |
| 3 | methane | none (300° C.) | orange | 3087 | 3705 | 39 | 8.7 | 0.55 |
| 4 | methane | none (350° C.) | green | 2209 | 3488 | 28 | 6.5 | 0.46 |
| 5 | methane | none (400° C.) | green | 1823 | 3646 | 22 | 5.2 | 0.32 |
| 6 | methane | none (450° C.) | green | 2338 | 2646 | 17 | 3.8 | 0.23 |
| 7* | none | none | orange | 2919 | 3434 | 47 | 10.3 | 0.64 |
| 8*† | none | none | orange | 3095 | 12379 | 62 | 14.2 | 0.91 |

*The catalyst was calcined at a temperature of 871° C.
†The polymerization reaction was conducted at 100° C. in the presence of 5 mL 1-hexene.

TABLE II

Inventive Examples 9-20 using Cr/silica-titania with light reduction

| Example | Reductant | Treatment | Color | Productivity (gPE/gCat) | Activity (g/g/h) | HLMI (g/10 min) | $I_{10}$ (g/10 min) | MI (g/10 min) |
|---|---|---|---|---|---|---|---|---|
| 9 | 10 psig ethylene | sunlight, 10 min | blue/gray | 2980 | 5430 | 88 | 23.1 | 1.72 |
| 10 | 12 psig ethylene | sunlight, 4 h | blue/gray | 2231 | 2434 | 71 | 17.6 | 1.38 |
| 11 | 12 psig ethylene | sunlight, 4 h | blue/gray | 2443 | 3858 | 57 | 14.6 | 1.10 |
| 12 | 10 psig ethylene (×2) | sunlight 6 h, 3 h | blue/gray | 2212 | 2328 | 30 | 7.1 | 0.50 |
| 13 | 10 psig methane | sunlight, 10 min | green | 2915 | 6780 | 114 | 26.3 | 1.95 |
| 14 | 10 psig methane | sunlight, 6 h | green | 3099 | 5469 | 70 | 16.7 | 1.17 |
| 15 | 10 psig Freon | sunlight, 2 h | green | 1554 | 1636 | 29 | 7.1 | 0.54 |
| 16 | 10 psig Freon | sunlight, 2 h | green | 2820 | 1945 | 29 | 7.0 | 0.55 |
| 17 | 4 drops benzene | sunlight 15 min | red/violet | 3951 | 5268 | 89 | 20.8 | 1.46 |
| 18* | 10 psig $h_2$ | sunlight, 15 min | green | 3297 | 2953 | 52 | 11.9 | 0.88 |
| 19* | 10 psig $h_2$ | sunlight 2 h | gray/green | 3437 | 3124 | 31 | 7.3 | 0.50 |
| 20*† | 10 psig methane | sunlight 6 h | green | 3239 | 14951 | 67 | 14.7 | 0.92 |

*The catalyst was calcined at a temperature of 871° C.
†The polymerization reaction was conducted at 100° C. in the presence of 5 mL 1-hexene.

Examples 21-26

Examples 21-26 employed a Cr/silica catalyst as the supported catalyst comprising a hexavalent chromium species (1.0 wt. % Cr). The Cr/silica catalysts were calcined at 650° C. in dry air (an oxidizing atmosphere) in order to convert the chromium to the hexavalent oxidation state. The Cr/silica catalyst had a BET surface area of 500 m²/g, a pore volume of 1.6 mL/g, and an average particle size of 100 μm. Table III summarizes various catalyst reductions, catalyst productivity (grams of polyethylene per gram of catalyst), catalyst activity (grams of polyethylene per gram of catalyst per hour), and resultant polymer HMLI, I10, and MI (g/10 min).

Using ethylene as the reductant, Examples 22-23 demonstrated comparable catalyst activity to Example 21, but an unexpected improvement in melt index potential. Also unexpectedly, the catalysts prepared with the methane reductant in sunlight resulted in a significant increase in catalyst activity, comparable melt index potential in ethylene homopolymerization (Example 24), and superior melt index potential in ethylene/1-hexene copolymerization (Example 26).

TABLE III

Examples using Cr/Silica Catalysts

| Ex. | Reductant | Treatment | Color | Productivity (gPE/gCat) | Activity (g/g/h) | HLMI (g/10 min) | I10 (g/10 min) | MI (g/10 min) |
|---|---|---|---|---|---|---|---|---|
| 21 | none | none | orange | 2347 | 2996 | 4.8 | 0.82 | 0.009 |
| 22 | 10 psig ethylene (×2) | sunlight 6 h, 3 h | blue/gray | 1409 | 3019 | 6.1 | 1.22 | — |
| 23 | 10 psig ethylene (×2) | sunlight 6 h, 3 h | blue/gray | 1814 | 1432 | 7.4 | 1.53 | 0.033 |
| 24 | 10 psig methane | sunlight, 6 h | green | 2603 | 4222 | 4.0 | 0.66 | — |
| 25[†] | none | none | orange | 2923 | 5480 | 2.4 | 0.21 | 0 |
| 26[†] | 10 psig methane | sunlight, 6 h | green | 3094 | 7140 | 3.6 | 0.60 | 0.014 |

[†]The polymerization reaction was conducted at 100 °C in the presence of 5 mL 1-hexene.

Examples 27-29

Figure 2:
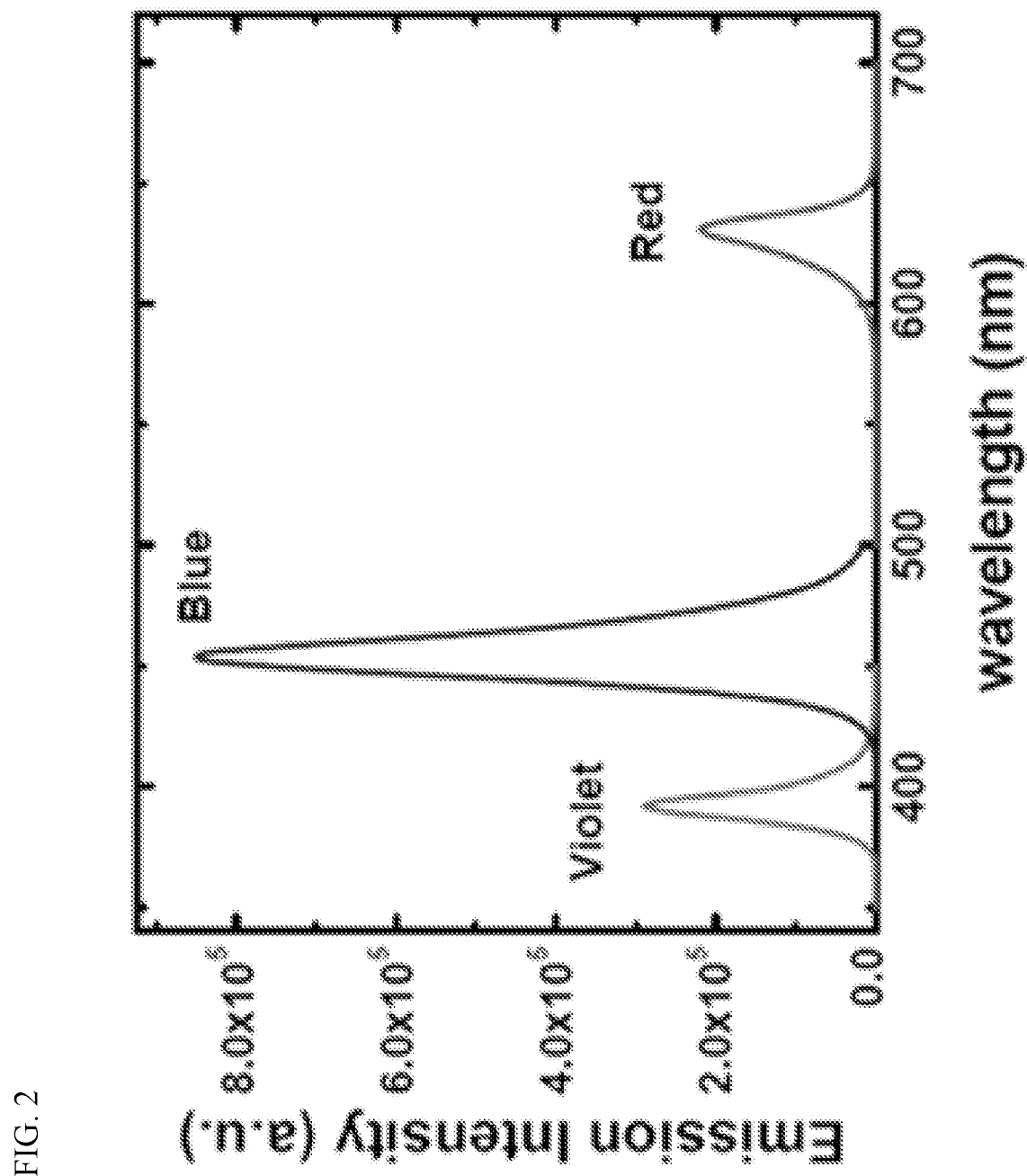
FIG. 2 presents a plot of the range of wavelengths emitted from red, blue, and violet LED diodes used to irradiate the supported chromium catalyst of Example 27.

Certain examples above were conducted in sunlight or alternatively, under a fluorescent light emitting a spectrum of UV-Visible light. In order to evaluate which wavelength of light may be most effective at reducing the hexavalent species, Cr/silica-titania catalyst as described above was prepared by calcining for 3 h at 650° C., and treating the calcined catalyst with a small amount (0.5 mL) of n-hexane in Example 27. Samples of the catalyst underwent a reduction step as conducted above, using one of a red LED (631 nm), blue LED (450 nm), or violet LED (392 nm) in glass bottles. The intensity and wavelength distribution of each light source is shown in FIG. 2. The color of each sample was monitored as an indicator of progress and efficiency of the reduction step. Of the three, the blue light was by far the most effective, whereas the red light achieved almost nothing. The violet light was also effective, but somewhat less so than the blue light. Since these experiments were conducted in glass containers that may absorb the shortest wavelengths of visible light, it is believed that a significant portion of the light emitted from the violet LED may have been absorbed by the glass.

Figure 3:
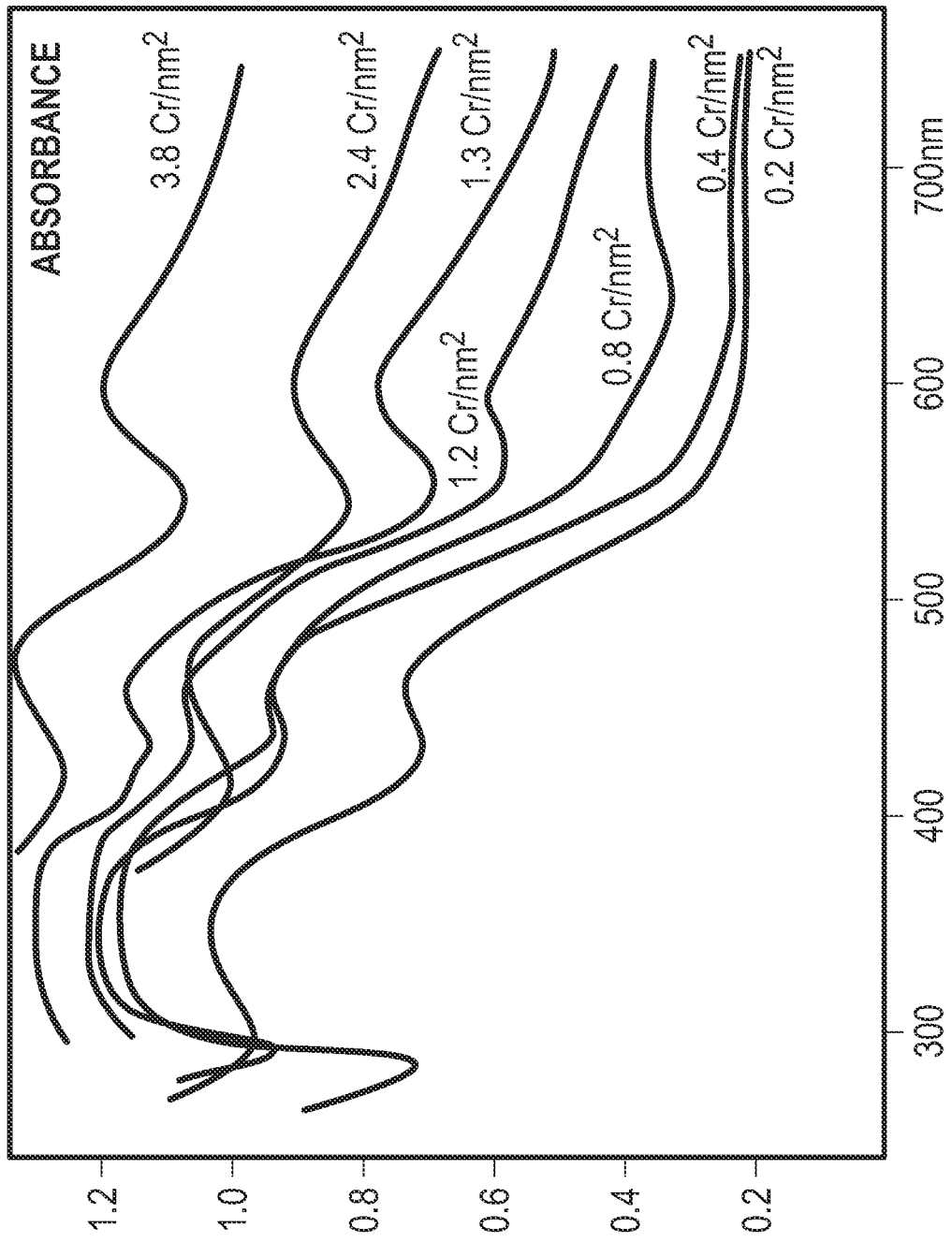
FIG. 3 present a plot of the IR reflectance of a Cr/silica catalyst of Example 28 calcined at 650° C.

In Example 28, IR reflectance spectra were obtained for a Cr/silica sample prepared as described above for Examples 21-26. As is shown in FIG. 3, the spectra demonstrate a strong absorbance at about 600 nm attributable to Cr(III) species, and another absorbance at about 340 nm attributable to Cr(VI) species. Thus, while not wishing to be bound by theory, a more effective light source for catalyst reduction should include wavelengths less than 500 nm (e.g., compare blue light versus red light in FIG. 2).

For Example 29, perfluorohexane was evaluated as a reductant in a manner similar to benzene (Example 17), but did not result in a color change. Perfluorohexane contains only C—F and C—C bonds. While not wishing to be bound by theory, it is believed that compounds with C—H bonds are more susceptible to oxidation under irradiation conditions.

Examples 30-45

Examples 30-45 were performed in the same manner as Examples 1-20 and, with the exception of Examples 36 and 42, used the same supported chromium catalyst comprising silica-titania (2.5 wt. % Ti and 1.0 wt. % Cr). The Cr/silica-titania catalysts were calcined at 871° C. in dry air. Examples 36 and 42 used a 10% Cr/silica catalyst that was calcined at 400° C. in dry air for 3 hr. Catalyst weights ranged from 0.04 to 0.26 grams and polymerization reaction times ranged from 30 to 240 for Examples 30-45. Table IV summarizes the various catalyst reductions, catalytic activity, polymer molecular weight properties, polymer rheological characterization, and polymer MI, $I_{10}$, and HLMI (g/10 min).

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 μL was used. The integral calibration method was used to deduce molecular weights and molecular weight distributions using a Chevron Phillips Chemical Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, Mz is the z-average molecular weight, Mv is viscosity-average molecular weight, and Mp is the peak molecular weight (location, in molecular weight, of the highest point of the molecular weight distribution curve).

Melt rheological characterizations were performed as follows. Small-strain (10%) oscillatory shear measurements were performed on an Anton Paar MCR 501 rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: $|\eta^*(\omega)|$=magnitude of complex shear viscosity;
$\eta_0$=zero shear viscosity;
$\tau_\eta$=viscous relaxation time (Tau($\eta$) in sec);
a="breadth" parameter (CY-a parameter);
n=fixes the final power law slope, fixed at 2/11; and
$\omega$=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

The long chain branches (LCBs) per 1,000,000 total carbon atoms of the overall polymer were calculated using the method of Janzen and Colby (*J. Mol. Struct.*, 485/486, 569-584 (1999), incorporated herein by reference in its entirety), from values of zero shear viscosity (determined from the Carreau-Yasuda (CY) model), and measured values of Mw obtained using a Dawn EOS multiangle light scattering detector (Wyatt).

As shown in Table IV, the light reduction step was surprisingly effective for several different hydrocarbon reductants: methane, ethane, n-pentane, n-hexane, toluene, decalin, adamantane, and cyclohexane. Example 34 (34 min) and Example 35 (91 min) used different polymerization times, as did Example 43 (61 min) and Example 44 (37 min). With the exception of Examples 36 and 42, the catalysts had surprising catalytic activity and melt index potential. Examples 30-33 in Table IV demonstrate that catalyst treatment with light irradiation in the presence of a reductant reduces the long chain branching content of the polymer produced, with an unexpected increase in the CY-a parameter.

As shown in Table IV, the polymers of Example 36 (0.26 g catalyst, 151 min reaction time) and Example 42 (0.2 g catalyst, 240 min reaction time), unexpectedly, had very broad molecular weight distributions (Mw/Mn in the 50-90 range) in combination with relatively high CY-a values (0.29-0.33), and very low levels of LCBs (less than 3 per million total carbon atoms). Also surprisingly, Table IV demonstrates that the polymer of Example 40 (0.057 g catalyst, 57 min reaction time) had a long high molecular weight tail, resulting in a Mz/Mw value in the 45-50 range, despite have a relatively narrow molecular weight distribution (Mw/Mn less than 10), and substantially no LCBs.

TABLE IV

Examples 30-45

| Example | Reductant | Treatment | Color | Productivity (gPE/gCat) | Activity (g/g/h) | HLMI (g/10 min) | $I_{10}$ (g/10 min) | MI (g/10 min) | CY-a |
|---|---|---|---|---|---|---|---|---|---|
| 30 | None | None | — | — | — | — | — | 4.45 | 0.199 |
| 31 | None | None | — | — | — | — | — | 0.16 | 0.193 |
| 32 | n-pentane | Sunlight 1 h | blue/gray | 3188 | 3298 | 154 | 36.4 | 3.65 | 0.226 |
| 33 | n-hexane | White light 3 h | blue/gray | 2251 | 2936 | 139 | 32.8 | 3.22 | 0.219 |
| 34 | toluene | Blue light 1.5 h | blue/black | 1481 | 3065 | 203 | 46.8 | 3.6 | 0.199 |
| 35 | toluene | Blue light 1.5 h | blue/black | 4235 | 3434 | 67 | 15.2 | 1.1 | 0.201 |
| 36 | n-pentane | UV light 3 h | black | 238 | 107 | 3.4 | 0.5 | — | 0.294 |
| 37 | 10 psig ethane | UV light 4 h | dark blue/gray | 2267 | 2616 | 113 | 26.8 | 2.1 | 0.196 |
| 38 | toluene | Blue light 2.5 h | black | 2312 | 2070 | 153 | 33.4 | 2.9 | 0.205 |
| 39 | decalin | Blue light 2 h | blue | 1954 | 2345 | 198 | 34.7 | 4.2 | 0.204 |
| 40 | adamantane | Blue light 2 h | blue | 2205 | 2646 | 166 | 30.6 | 3.5 | 0.200 |
| 41 | cyclohexane | Blue light 2 h | blue | 2423 | 1069 | 47 | 7.3 | 0.8 | 0.210 |
| 42 | None | None | dark red | 262 | 81 | 0.5 | — | — | 0.327 |
| 43 | methane | Blue light 2 h | green | 2692 | 2884 | 157 | 36.5 | 3.4 | 0.229 |
| 44 | methane | Blue light 2 h | blue/gray | 1024 | 1920 | 82 | 18.6 | 1.5 | 0.174 |
| 45 | None | None | orange | 2668 | 2541 | 220 | 51.7 | 4.6 | 0.219 |

| Example | Reductant | Mn (kg/mol) | Mw (kg/mol) | Mz (kg/mol) | Mw/Mn | Mz/Mw | $\eta_0$ (Pa-sec) | $\tau_\eta$ (sec) | J-C LCB (per MM C) |
|---|---|---|---|---|---|---|---|---|---|
| 30 | None | — | — | — | — | — | — | — | — |
| 31 | None | — | — | — | — | — | — | — | — |
| 32 | n-pentane | 14.7 | 100 | 579 | 6.8 | 5.8 | 9.68E+03 | 0.016 | 8.8 |
| 33 | n-hexane | 9.8 | 102 | 962 | 10.3 | 9.5 | 1.24E+04 | 0.022 | 9.9 |
| 34 | toluene | 11.1 | 107 | 1060 | 9.6 | 9.9 | 1.24E+04 | 0.020 | 7.8 |
| 35 | toluene | 14.3 | 142 | 1129 | 9.9 | 8.0 | 4.42E+04 | 0.081 | 6.4 |
| 36 | n-pentane | 8.3 | 416 | 2810 | 50.3 | 6.8 | 4.11E+06 | 50.4 | 2.2 |
| 37 | ethane | 9.6 | 120 | 1159 | 12.5 | 9.6 | 2.29E+04 | 0.034 | 7.7 |
| 38 | toluene | 14.7 | 101 | 760 | 6.9 | 7.5 | 1.26E+04 | 0.020 | 10.3 |

TABLE IV-continued

Examples 30-45

| | | | | | | | | | |
|---|---|---|---|---|---|---|---|---|---|
| 39 | decalin | 14.4 | 108 | 835 | 7.5 | 7.7 | 9.74E+03 | 0.014 | 5.9 |
| 40 | adamantane | 17.2 | 166 | 8076 | 9.6 | 48.6 | 1.20E+04 | 0.015 | <0.01 |
| 41 | cyclohexane | 15.7 | 162 | 1453 | 10.4 | 9.0 | 5.23E+04 | 0.111 | 4.2 |
| 42 | None | 6.3 | 557 | 3342 | 88.5 | 6.0 | 7.01E+06 | 49.6 | 1.2 |
| 43 | methane | 13.8 | 104 | 726 | 7.5 | 7.0 | 8.20E+03 | 0.014 | 6.2 |
| 44 | methane | 14.3 | 130 | 1165 | 9.1 | 9.0 | 3.31E+04 | 0.024 | 7.4 |
| 45 | None | 12.9 | 102 | 843 | 7.9 | 8.3 | 8.01E+03 | 0.013 | 6.6 |

Examples 46-52

Examples 46-52 were performed to determine the extent of reduction of the hexavalent chromium and the average valence after reduction in a representative supported chromium catalyst. Table V summarizes the results. Example 52 was a chromium/silica-titania catalyst containing approximately 0.8 wt. % chromium and 7 wt. % titania, and having a BET surface area of 530 m$^2$/g, a pore volume of 2.6 mL/g, and an average particle size of 130 um, which was calcined in dry air at 850° C. for 3 hr to convert chromium to the hexavalent oxidation state (orange). This converted over 86 wt. % of the chromium into the hexavalent state. For Examples 46-47, approximate 2 g samples of the catalyst of Example 52 were separately charged to a glass reaction vessel and 0.5 mL of liquid isopentane was charged to the vessel. For Examples 48-49, about 1.5 atm of gaseous methane was charged to the glass bottle. Then, the bottle was placed in a light-proof box under blue fluorescent light (approximately 2 times the intensity expected from sunlight), and the bottle was continuously rotated so that all of the catalyst was exposed to the light for 24 hr. The final catalyst color is noted in Table V. Afterward, into the bottle, along with the catalyst, was introduced about 20 mL of a solution of 2 M H$_2$SO$_4$. To this was added 5 drops of ferroin Fe(+3) indicator. This usually turned a blue-green color indicating the presence of Fe(III) ions. Next, the solution was titrated to the ferroin endpoint (red color) using a solution of ferrous ammonium sulfate, which had been previously calibrated by reaction with a standardized 0.1 M sodium dichromate solution. When the solution turned red, the end point was signaled, and the titrant volume was recorded, to calculate the oxidation capacity of the catalyst, expressed as wt. % Cr(VI) and as percent reduced, that is, the percent of the original Cr(VI) oxidative power that has been removed by the reduction treatment. The average valence was also computed by multiplying the percent reduced by +3 and subtracting that number from +6.

Of course, this treatment gives only an average oxidation state. Note that although Table V lists the oxidative power measured as wt. % Cr(VI), in reality all of the chromium could be present in lower valence states, such as Cr(IV) or Cr(V). Thus, the Cr(VI) value in Table V only lists the maximum amount of Cr(VI) that could be present. More likely, the reduced catalysts have a combination of several valence states that produce the measured oxidative power. Note that some of the reduced chromium, and particularly those catalysts reduced with CO, may be in the divalent state, which would not have been detected in this test, which stops in the trivalent state.

Example 52 demonstrates that the air-calcined chromium catalyst contained substantially most of its chromium (0.69/0.80=86 wt. %) present as Cr(VI), and it is this Cr(VI) amount that is being reduced in the light treatment. Therefore, this amount of Cr(VI) serves as the starting amount, which had an average valence of +6, and which serves as a reference, to which the reduced catalysts are then compared. Examples 46-47 were reduced chromium catalysts with an average valence of approximately +3.3, with no more than 0.06 wt. % Cr(VI), and with less than 10 wt. % of the starting hexavalent chromium still remaining in the hexavalent oxidation state. Examples 48-49 were reduced chromium catalysts with an average valence of approximately +4.1, with no more than 0.26 wt. % Cr(VI), and with less than 40 wt. % of the chromium in the hexavalent oxidation state. For Examples 50-51, the catalyst was reduced in CO with either blue light or elevated temperature, resulting in no oxidative power being measured (0 wt. % Cr(VI) in the table). Thus, the average valence must be no more than +3. But the catalyst that was CO-reduced by conventional means (Example 51) is known to have a valence of mostly Cr(II), which is not detected in this test. Accordingly, Examples 50 and 51 are listed as less than or equal to +3. Notably, this test cannot distinguish between Cr(II) and Cr(III) species, but there was no measurable amount of hexavalent chromium in Examples 50-51.

TABLE V

Examples 46-52

| Example | Reductant | Treatment | Color | Catalyst (g) | Cr(VI) (wt. %) | Reduced (wt. %) | Average Valence |
|---|---|---|---|---|---|---|---|
| 46 | isopentane | Blue light 24 hr | blue | 2.05 | 0.06 | 90.8 | 3.28 |
| 47 | isopentane | Blue light 24 hr | blue | 2.08 | 0.06 | 90.9 | 3.27 |
| 48 | methane | Blue light 24 hr | olive green | 2.14 | 0.26 | 62.3 | 4.13 |
| 49 | methane | Blue light 24 hr | olive green | 2.30 | 0.26 | 61.9 | 4.14 |
| 50 | CO | Blue light 2 hr | blue green | 2.33 | 0.00 | 100 | ≤3 |

TABLE V-continued

Examples 46-52

| Example | Reductant | Treatment | Color | Catalyst (g) | Cr(VI) (wt. %) | Reduced (wt. %) | Average Valence |
|---|---|---|---|---|---|---|---|
| 51 | CO | CO reduction 30 min - 350° C. | blue | 2.52 | 0.00 | 100 | ≤3 |
| 52 | None | None | orange | — | 0.69 | 0 | 6.00 |

Examples 53-77

In Examples 53-77, Catalyst A was a Cr/silica catalyst containing 1 wt. % Cr, with a BET surface area of 500 m$^2$/g, a pore volume of 1.6 mL/g, and an average particle size of 100 um. Prior to use, the catalyst was calcined in air at 650° C. for 3 hr to form the chromium (VI)/silica catalyst. Catalyst B was a Cr/silica-titania catalyst containing 1 wt. % Cr and 4.2 wt. % TiO$_2$, with a BET surface area of 500 m$^2$/g, a pore volume of 2.5 mL/g, and an average particle size of 130 um. Prior to use, the catalyst was calcined in air at 870° C. for 3 hr to form the chromium (VI)/silica-titania catalyst. Catalyst C was a Cr/silica containing 10 wt. % Cr, with a BET surface area of 500 m$^2$/g, a pore volume of 1.6 mL/g, and an average particle size of 100 um. Prior to use, the catalyst was calcined in air at 400° C. for 3 hr to form the chromium (VI)/silica catalyst. Catalyst D was a Cr/silica-titania containing 1 wt. % Cr and 7.5 wt. % TiO$_2$, with a BET surface area of 550 m$^2$/g, a pore volume of 2.5 mL/g, and an average particle size of 130 um. Prior to use, the catalyst was calcined in air at 850° C. for 3 hr to form the chromium (VI)/silica-titania catalyst.

For the reductions of Examples 53-77, approximately two grams of the supported chromium catalyst were first charged to an air-tight glass container at 25° C., followed by the addition of the hydrocarbon reductant. The glass container was then exposed to a light source as noted in Table VI below. For examples where the glass container was exposed to sunlight, the container was taken outside and placed in direct sunlight, slowly rotating the container to ensure even exposure of the mixture of the supported chromium catalyst and the hydrocarbon reactant. For examples where the glass container was exposed to artificial light, the sample was placed in a box containing a fluorescent light or a LED light. Reduction of the supported chromium catalysts was monitored by the presence of a color change. For each catalyst, the starting hexavalent supported chromium catalyst had an orange color which darkened significantly upon exposing the catalyst to light in the presence of the hydrocarbon reactant, indicating reduction of the supported chromium catalyst starting material, and formation of the reduced chromium catalyst.

After the desired exposure time, the reduced chromium catalyst was mixed with a hydrolysis agent to cleave the hydrocarbon-containing ligand from the reduced chromium catalyst. The hydrolysis agent used was water, methanol, ethanol, or trifluoroethanol, or a mixture thereof, and was selected to not interfere with analysis of the reaction product (e.g., methanol was not used as the hydrolysis agent when the reaction product after hydrolysis could contain methanol).

A GC-MS procedure was used to analyze the reaction product, as follows. Gas chromatography was performed using an Agilent 7890B GC equipped with an all-purpose capillary column (Agilent J&W VF-5 ms, 30 m×0.25 mm×0.25 µm). Approximate 0.5 µL sample aliquots were injected into a GC port held at 250° C. using a split ratio of 10:1. The carrier gas was ultra-high purity helium and was electronically controlled throughout the run to a constant flow rate of 1.2 mL/min. Initial column temperature was held at 50° C. for 5 min, ramped at 20° C./min to 250° C., and then held at 250° C. for 19 min. Spectral assignment was made via mass correlation using an Agilent 5977B mass spectrometer connected to the GC unit using electron ionization at 70 eV. The nominal mass range scanned was 14-400 m/z using a scan time of 0.5 sec. Nominal detector voltage used was 1200 V.

Table VI summarizes the results of Examples 53-77, and lists the specific chromium catalyst, the hydrocarbon reductant, the light treatment, and an analysis of the reaction product after hydrolysis. Examples 53-58 demonstrate the unexpected finding that the —O-Hydrocarbon group on the chromium catalyst after reduction was a —O-Methane group; the reaction product after hydrolysis to cleave the hydrocarbon-containing ligand from the catalyst was predominantly methanol. Similar surprising results were found for chromium catalysts with a —O-n-Pentane group (pentanol hydrolysis product), a —O-n-Hexane group (hexanol hydrolysis product), and a —O-Cyclohexane group (cyclohexanol hydrolysis product), among others. Likewise, a chromium catalyst with a —O-Toluene group (benzaldehyde hydrolysis product) also was produced. In Example 63, toluene was converted into benzaldehyde (no alcohol), but in Example 68, toluene was converted into a variety of alcohol and carbonyl products; the only difference between these examples was the irradiation exposure time. When the reductant was dichloromethane, no alcohol or carbonyl hydrolysis product was noted. However, it is believed that other halogenated hydrocarbon materials would form —O-Halogenated hydrocarbon groups on the chromium catalyst, such as tetrafluoroethane (see Examples 15-16).

TABLE VI

Summary of Examples 53-77.

| Example | Catalyst | Reductant | Light treatment | Reaction product after hydrolysis |
|---|---|---|---|---|
| 53 | A | 1.7 atm methane | 10 hr sunlight | 83% methanol, 17% ethanol |
| 54 | A | 1.7 atm methane | 3 hr sunlight | 61% methanol, 34% ethanol, 3% propanoic acid, 2% acetic acid |

TABLE VI-continued

Summary of Examples 53-77.

| Example | Catalyst | Reductant | Light treatment | Reaction product after hydrolysis |
|---|---|---|---|---|
| 55 | B | 1.7 atm methane | 10 hr sunlight | 55% ethanol, 45% methanol |
| 56 | A | 1.7 atm methane | 6 hr sunlight | no carboxylates detected, alcohols not analyzed |
| 57 | B | 1.7 atm methane | 6 hr sunlight | 100% methanol, no carboxylates |
| 58 | A | 1.7 atm methane | 6 hr sunlight | 100% methanol |
| 59 | A | 1.7 atm ethylene | 3 hr sunlight | 42% methanol, 56% formic acid, 2% acetic acid |
| 60 | B | 1.7 atm ethylene | 3 hr sunlight | 76% formic acid, 21% methanol, 2% acetic acid, 1% ethanol |
| 61 | B | 0.5 mL n-pentane | 1 hr sunlight | 2-pentanol > 2-pentanone > 1-pentanol >> 3-pentanone |
| 62 | B | 0.5 mL n-hexane | 3 hr white fluorescent light | 2-hexanol > 3-hexanol > 1-hexanol > 2-hexanone > 3-hexanone > 1-hexanone > 1-butanol > C7&C18 oxygenates >> hexanal |
| 63 | B | 0.5 mL toluene | 1.5 hr blue fluorescent light | benzaldehyde |
| 64 | C | 0.5 mL n-pentane | 3 hr UV fluorescent light | 2-pentanone > 2-pentanol > 3-pentanone >> 1-pentanone = enones = enols |
| 65 | D | 0.5 mL n-pentane | 3 hr blue fluorescent light | 2-pentanol > 2-pentanone > 1-pentanol >> 3-pentanone |
| 66 | D | 0.5 mL n-hexane | 3 hr blue fluorescent light | 2-hexanol > 3-hexanol > 1-hexanol > 2-hexanone > 3-hexanone > 1-hexanone > 1-butanol > C7&C18 oxygenates >> hexanal, no alkanes |
| 67 | D | 0.5 mL n-pentane | 3 hr blue fluorescent light | 2-pentanol > 1-pentanol > 2-pentanone > C7-C18 oxygenates, no alkanes |
| 68 | D | 0.5 mL toluene | 3 hr blue fluorescent light | benzaldehyde > benzyl alcohol > benzophenone = 4-Me benzophenone => 2-Me Phenol = 2-Me benzophenone = 3-Me Benzophenone > 4-Me Phenol > 3-Me Benzaldehyde |
| 69 | D | 10% Cr n-pentane | 18 hr blue fluorescent light | 2-pentanone > 2-pentanol > 3-pentanone >> 1-pentanone = c7 enones = c7 enols |
| 70 | D | 0.5 mL cyclohexane | 3 hr blue LED light | cyclohexanol >= cyclohexanone >> cyclohexenone >> maybe C14&C18 oxygenates |
| 71 | D | 0.5 mL decalin | 3 hr blue LED light | decahydronaphthalene (C10H18) (two isomers) > tetrahydronaphthalene (C10H12) >> various bicyclic C10 alcohols (with the OH at different positions) |
| 72 | D | 0.5 mL adamantane | 3 hr blue LED light | adamantanol > andamantanone >+ another isomer of adamantanol |
| 73 | D | 0.5 mL isopentane | 7 hr blue fluorescent light | 4 isomers of C5-OH, similar size, only a trace of ketone |
| 74 | D | 0.5 mL n-pentane | 7 hr blue fluorescent light | 2-pentanol > another pentanol, no ketones |
| 75 | D | 0.5 mL cyclohexane | 7 hr blue fluorescent light | cyclopentanol >> likely dimer ethers C10H20O2 |
| 76 | D | 0.5 mL n-hexane | 7 hr blue fluorescent light | 7 isomers of dodecene, and trace of C6H10O3 (an aldehyde at one end and an ester at the other) |
| 77 | D | 0.5 mL dichloro methane | 7 hr blue fluorescent light | nothing identified |

Examples 78-94

Table VII summarizes Examples 78-92. In these examples, Catalyst A was a Cr/silica-titania containing 2.5 wt. % Ti and 1 wt. % Cr, with an average particle size of 130 um, a pore volume 2.5 mL/g, and a BET surface area of 500 m$^2$/g. Prior to use, the catalyst was calcined in dry air for 3 hr at 871° C. to form a chromium (VI)/silica-titania catalyst. Catalyst B was a light reduced catalyst prepared by exposing Catalyst A to 1.5 atm of deuterated propylene (C3D6) under sunlight for 2 hr at 25° C. Excess deuterated propylene was then purged with N$_2$. Catalyst C was a light reduced catalyst prepared by exposing Catalyst A to 0.25 mL/g of deuterated n-hexane (C6D14) under sunlight for 2 hr at 25° C. Catalyst D was a light reduced catalyst prepared by exposing Catalyst A to 0.25 mL/g of deuterated cyclohexane (C6D12) under blue fluorescent light for 2 hr at 25° C. Catalyst E was a light reduced catalyst prepared by exposing Catalyst A to 0.25 mL/g of deuterated toluene (C7D8) under blue fluorescent light for 2 hr at 25° C. Catalyst F was a CO-reduced catalyst prepared by flushing Catalyst A at 350° C. with N$_2$ for 15 min, then treating with 100% CO for 30 min at 350° C., and flushing again with N$_2$ for 15 min, and followed by cooling at 25° C. and storing under N$_2$. In Table VII, Catalyst F was subsequently subjected to the treatment shown in Table VII for 10-15 min prior to polymerization.

Polymerization experiments for Examples 78-94 utilized approximately 2 g of catalyst, a reaction time in the 10-25 minute range (to produce 1-2 grams of polymer per gram of catalyst), an ethylene pressure of 24-30 psig (normal unlabeled ethylene), and a polymerization temperature of 50° C. (unless noted otherwise). Isopropanol or ethanol was used to quench the reaction.

For NMR analysis, the samples were prepared in 10 mm NMR tube. About 0.3 g of selectively deuterium-labeled polyethylene samples was dissolved in a mixture of 2.5 mL 1,2,4-trichlorobenzene (TCB) and 1.20 g of 1,4-dichlorobenzene-$d_4$ (DCB-$d_4$) for $^1$H and $^{13}$C NMR data collection. For solution-state deuterium ($^2$H) NMR data collection, about 0.3 g of the polyethylene samples and the model compound were dissolved in 2.5 mL of non-deuterated TCB solvent.

The sample and the solvent (or solvent mixture) were heated in a heating block at 130° C. for 4-5 hr. The mixture was occasionally stirred with a stainless-steel stirrer to ensure homogeneous mixing. The resulting solution was then left overnight (for 15-16 hr) in the heating block at 112° C. to ensure complete disentanglement of the polymer chains. The final concentrations of the resulting solutions were about 5-7 wt. %.

The NMR data were collected in a 500 MHz NMR instrument comprised of a 500 MHz Oxford magnet and Bruker's Avance III HD console. A 10 mm BBO probe fitted with z-gradient was used for $^1$H, $^2$H and $^{13}$C NMR data collection. The deuterium lock channel of the instrument was used for $^2$H NMR data collection. All the NMR data were collected at 125° C. and the sample was equilibrated at 125° C. for 15 min before the start of data acquisition. The data were collected and processed with Bruker's Topspin software (v. 3.2).

The $^1$H NMR data were collected with standard pulse sequence using the standard parameter set including: a 7.4 μsec 90° pulse width, a 7.5 kHz spectral window, 5.0 sec relaxation delay, and 5.0 sec acquisition time. 1024 transients were averaged to obtain enough signal-to-noise ratio (SNR) to detect the signals originated from terminal olefins. The data was zero filled with 131 k data points and exponentially weighted with 0.30 Hz line-broadening before Fourier transformation. The spectrum was referenced with the residual proton peak of DCB-$d_4$ solvent (δ~7.16 ppm).

The $^2$H NMR (deuterium) data were collected with standard pulse sequence using the standard parameter set including: a 225 μsec 90° pulse width, a 1.15 kHz spectral window, 2.0 sec relaxation delay, and 0.99 sec acquisition time. 16 k transients were collected and averaged to obtain enough SNR to detect the methyl signal. The data was zero filled with 8 k data points and exponentially weighted with 2.0 Hz line-broadening before Fourier transformation. The spectrum was referenced with the natural abundance deuterium peak of non-deuterated TCB solvent (the chemical shift of the central peak of the triplet is calibrated at δ~7.2 ppm).

The $^{13}$C NMR spectra of the polyethylene samples were collected with standard pulse program using the standard parameter set including: a 13.0 μsec 90° pulse width, a 21.7 kHz spectral window, 7.0 sec relaxation delay, and 3.0 sec acquisition time. 8 k transients were collected in an overnight experiment and full NOE was exploited during data collection to improve the SNR at a reasonable amount of time. The data was zero filled with 2 times of time-domain (TD) data points and exponentially weighted with a 1.0 Hz line-broadening before Fourier transformation.

The $^2$H NMR data in Table VII demonstrates, unexpectedly, that the reductant used in Catalysts B-E was incorporated into the polymer as a terminal or end group. Likewise, the adjuvant material of CO-reduced Catalyst F, also unexpectedly, was incorporated into the polymer as a terminal or end group. Thus, terminal alkane, cyclic alkane, and aromatic end groups were incorporated into an ethylene polymer.

The NMR data in Table VII also demonstrates ethylene homopolymers with a surprising combination of a relatively high number of methyl short chain branches (SCB's) and a relatively low number of butyl SCB's per 1000 total carbon atoms. The homopolymers of Examples 78, 82-84, 86, and 90-91 have at least 3.5 methyl SCB's per 1000 total carbon atoms and less than 0.6 butyl SCB's. Moreover, these homopolymers have ratios of vinyl chain ends to saturated chain ends (vinyl/saturated) per 1000 total carbon of less than 0.1 (and zero in most cases), which is particularly unexpected, given that conventional chromium-based polymers often have vinyl/saturated ratios between 0.5 and 1.0.

Figure 4:
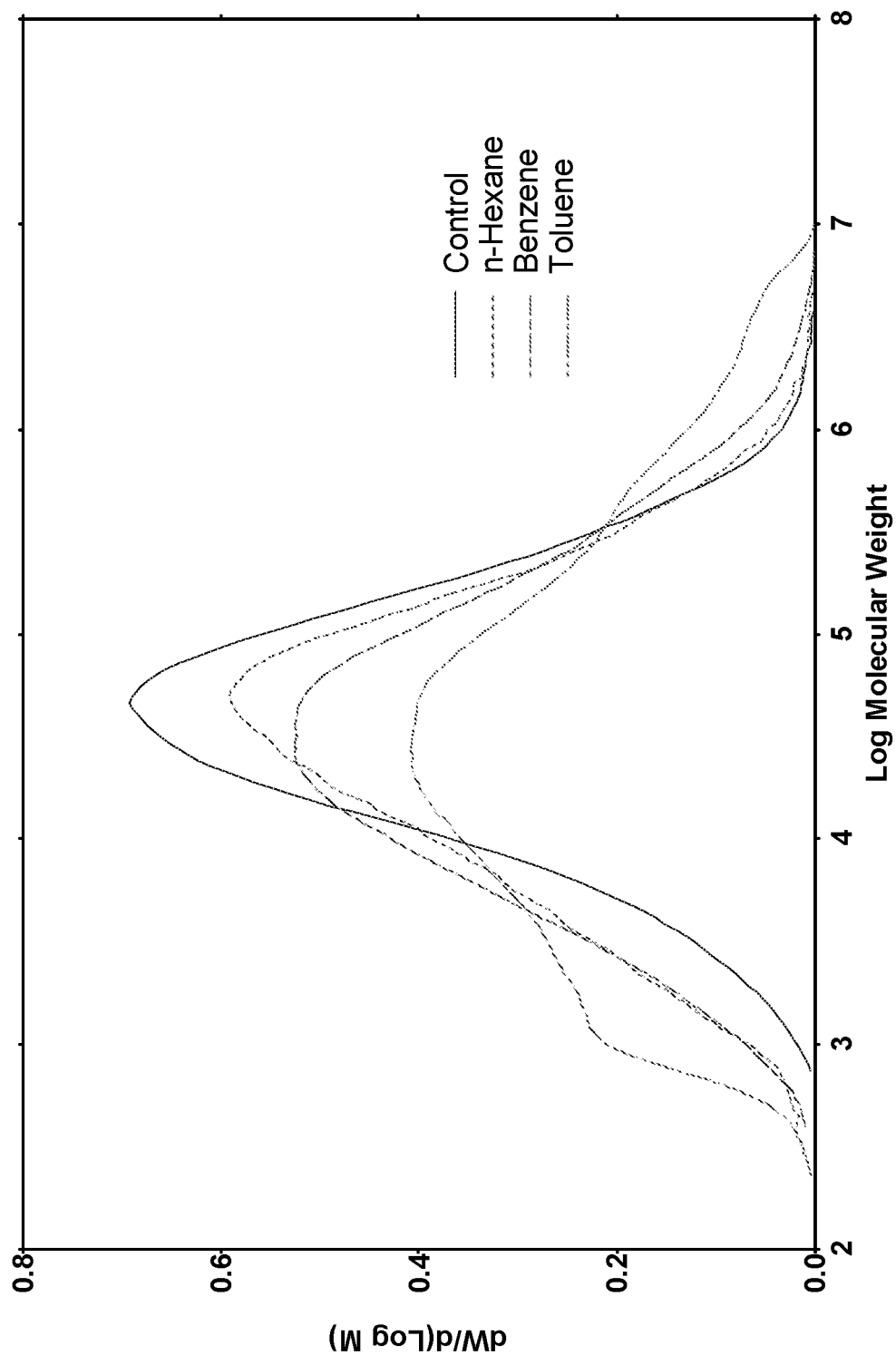
FIG. 4 presents a plot of the molecular weight distributions of the polymers of Examples 88-89 and 93-94.

FIG. 4 illustrates the molecular weight distributions of the polymers of Examples 88-89 and 93-94, and Table VIII summarizes certain molecular weight features. The adjuvant used in Example 88 was n-hexane, while Example 89 used toluene, and Example 93 used benzene (prepared similarly to Example 89). Example 94 was a control experiment in which no adjuvant was used. As shown in FIG. 4 and Table VIII, the polymer of Example 89 (toluene adjuvant) had a surprising combination of a relatively large amount of the polymer having a molecular weight greater than 1,000,000 g/mol (over 6 wt. %) and a relatively large amount of the polymer having a molecular weight less than 1000 g/mol (over 4 wt. %). Note also the large Mw/Mn of 47 shown in Table VIII.

TABLE VII

Summary of Examples 78-92.

| Example | Catalyst | Starting Valence | Other Treatment | Polymerization Temp | $^2$H NMR Deuterium Signals** |
|---|---|---|---|---|---|
| 78 | B | Cr + 6 | None | 0° C. | $CD_2$, $CD_3$, CD |
| 79 | C | Cr + 6 | None | 50° C. | CD, $CD_2$, $CD_3$, D-allyl, D-term-vinyl |
| 80 | D | Cr + 6 | None | 50° C. | CD, $CD_2$, $CD_3$, D-allyl, less D-term-vinyl |
| 81 | E | Cr + 6 | None | 80° C. | Aromatics, $CD_2$, $CD_3$, maybe allyl |
| 82 | F | Cr + 2 | $C_2D_4$ −78° C. | 80° C. | $CD_3$, $CD_2$ |
| 83 | F | Cr + 2 | $C_2D_4$ 0° C. | 0° C. | $CD_3$, $CD_2$ |
| 84 | F | Cr + 2 | $C_2D_4$ −78° C. | 80° C. | $CD_3$, $CD_2$ |
| 85 | F | Cr + 2 | $C_2D_4$ −78° C. | 0° C. | $CD_2$, $CD_3$ |
| 86 | F | Cr + 2 | $C_3D_6$ −78° C. | 50° C. | $CD_3$, $CD_2$, CD, D-vinylidene, D-vinylene |
| 87 | F | Cr + 2 | $C_3D_6$ −78° C. | 50° C. | $CD_3$, $CD_2$, CD, D-vinylidene, D-vinylene |
| 88 | F | Cr + 2 | $C_6D_{14}$ 25° C. | 50° C. | $CD_3$, $CD_2$– |
| 89 | F | Cr + 2 | $C_7D_8$ 25° C. | 50° C. | Aromatics, $CD_2$, maybe D-allyl |
| 90 | F | Cr + 2 | $C_2D_4$ 0° C. | 0° C. | N/A - ethanol quench |
| 91 | B* | Cr + 6 | None | 0° C. | N/A |
| 92 | F | Cr + 2 | $C_3D_6$ 25° C. | 25° C. | N/A |

TABLE VII-continued

Summary of Examples 78-92.

| Example | Mn (kg/mol) | Mw (kg/mol) | Mz (kg/mol) | Mw/Mn | Mz/Mw |
|---|---|---|---|---|---|
| 78 | 10.1 | 50 | 146 | 4.9 | 2.9 |
| 79 | 11.2 | 78 | 342 | 7.0 | 4.4 |
| 80 | 8.3 | 50.2 | 224 | 6.0 | 4.5 |
| 81 | 11.7 | 66 | 211 | 5.7 | 3.2 |
| 82 | 10.6 | 54 | 173 | 5.0 | 5.4 |
| 83 | 16.9 | 129 | 625 | 7.6 | 4.9 |
| 84 | 9.9 | 76 | 250 | 7.7 | 7.3 |
| 85 | 12.7 | 196 | 1225 | 11.6 | 5.4 |
| 86 | 12.1 | 59 | 277 | 4.9 | 4.7 |
| 87 | 17.1 | 199 | 1075 | 11.6 | 5.4 |
| 88 | 8.9 | 100 | 628 | 11.2 | 6.3 |
| 89 | 5.5 | 258 | 2449 | 47.1 | 9.5 |
| 90 | 14.0 | 107 | 597 | 7.6 | 5.6 |
| 91 | 9.3 | 45 | 160 | 4.9 | 3.5 |
| 92 | 11.2 | 78 | 342 | 7.0 | 4.4 |

| Example | Vinyl (1000 TC) | Saturated (1000 TC) | Vinyl/Saturated | Methyls (1000 TC) | Ethyls (1000 TC) | Butyls (1000 TC) |
|---|---|---|---|---|---|---|
| 78 | 0 | 6.46 | 0.00 | 5.70 | 1.20 | 0.00 |
| 79 | — | — | — | — | — | — |
| 80 | 0.86 | 3.94 | 0.22 | 0.60 | 0.00 | 0.00 |
| 81 | 0 | 5.95 | 0.00 | 2.85 | 0.10 | 0.00 |
| 82 | 0 | 5.18 | 0.00 | 5.65 | 1.80 | 0.10 |
| 83 | 0 | 2.33 | 0.00 | 4.05 | 3.20 | 0.30 |
| 84 | 0 | 3.82 | 0.00 | 9.05 | 0.00 | 0.00 |
| 85 | 0 | 1.52 | 0.00 | 3.10 | 1.15 | 0.00 |
| 86 | 0.23 | 4.55 | 0.05 | 6.00 | 1.80 | 0.00 |
| 87 | 0.63 | 0.78 | 0.81 | 2.10 | 0.20 | 0.00 |
| 88 | — | — | — | — | — | — |
| 89 | — | — | — | — | — | — |
| 90 | 0 | 2.40 | 0.00 | 4.85 | 3.00 | 0.00 |
| 91 | 0 | 6.39 | 0.00 | 5.00 | 1.15 | 0.00 |
| 92 | 0.3 | 3.69 | 0.08 | 0.05 | 0.15 | 0.00 |

B*—Example 91 was performed similarly to Example 78, except deuterated ethylene was used instead of propylene.
**D-allyl: $CH_2 = CH-CD-$; D-terminal vinyl: $CD_2 = CD-$; D-vinylidene: $= CD_2$; D-vinylene: $-CD = CD-$

TABLE VIII

Examples 88-89 and 93-94.

| | Example | | | |
|---|---|---|---|---|
| Adjuvant treatment | 88 n-Hexane | 89 Toluene | 93 Benzene | 94 Control |
| Weight percentage having a molecular weight less than | | | | |
| 1000 g/mol | 1.5 | 4.2 | 1.4 | 0.2 |
| 10,000 g/mol | 23.1 | 30.9 | 24.6 | 14.3 |
| 100,000 g/mol | 76.0 | 70.3 | 74.4 | 74.6 |
| 1,000,000 g/mol | 99.0 | 93.6 | 97.7 | 99.2 |
| Weight percentage having a molecular weight greater than | | | | |
| 1,000,000 g/mol | 1.0 | 6.4 | 2.3 | 0.8 |
| 100,000 g/mol | 24.0 | 29.7 | 25.6 | 25.4 |
| 10,000 g/mol | 76.9 | 69.1 | 75.4 | 85.7 |
| 1000 g/mol | 98.5 | 95.8 | 98.6 | 99.8 |
| Weight percentage having a molecular weight in the range of | | | | |
| 1000 to 10,000 g/mol | 21.6 | 26.7 | 23.2 | 14.1 |
| 10,000 to 100,000 g/mol | 52.9 | 39.5 | 49.7 | 60.3 |
| 100,000 to 1 million g/mol | 23.0 | 23.3 | 23.3 | 24.6 |
| 10,000 to 1 million g/mol | 75.9 | 62.8 | 73.1 | 84.9 |
| 100,000 to 1 million g/mol | 23.0 | 23.3 | 23.3 | 24.6 |
| Less than <3162 g/mol | 8.6 | 15.2 | 7.9 | 3.2 |
| Lowest and highest measured molecular weights (g/mol) | | | | |
| Lowest MW | 292 | 231 | 398 | 744 |
| Highest MW | 4,604,156 | 9,812,507 | 7,176,951 | 3,718,348 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A supported chromium catalyst comprising:
a solid support; and from about 0.01 to about 20 wt. % chromium, based on the weight of the catalyst; wherein:
the chromium has an average valence of less than or equal to about 5.25; and
at least one bonding site on the chromium has a ligand characterized by one of the following formulas:
—O-Hydrocarbon group or —O-Halogenated hydrocarbon group.

Aspect 2. The catalyst defined in aspect 1, wherein the molar ratio of the hydrocarbon group to chromium is in any suitable range or any range disclosed herein, e.g., from about 0.25:1 to about 2:1, from about 0.5:1 to about 2:1, from about 0.5:1 to about 1.5:1, from about 0.75:1 to about 1.75:1, or from about 0.75:1 to about 1.25:1.

Aspect 3. The catalyst defined in aspect 1 or 2, wherein the supported chromium catalyst comprises any suitable amount of chromium or an amount in any range disclosed herein, e.g., from about 0.01 to about 10 wt. %, from about 0.05 to about 15 wt. %, from about 0.1 to about 15 wt. %, from about 0.2 to about 10 wt. %, from about 0.1 to about 5 wt. %, or from about 0.5 to about 2.5 wt. % of chromium, based on the weight of the catalyst.

Aspect 4. The catalyst defined in any one of the preceding aspects, wherein the supported chromium catalyst comprises any suitable amount of chromium in an oxidation state of +5 or less, or an amount in any range disclosed herein, e.g., from about 0.01 to about 20 wt. %, from about 0.01 to about 10 wt. %, from about 0.05 to about 15 wt. %, from about 0.1 to about 15 wt. %, from about 0.2 to about 10 wt. %, from about 0.1 to about 5 wt. %, or from about 0.5 to about 2.5 wt. % of chromium in an oxidation state of +5 or less, based on the weight of the catalyst.

Aspect 5. The catalyst defined in any one of the preceding aspects, wherein the catalyst comprises chromium having an average valence of less than or equal to about 5.25, less than or equal to about 5, less than or equal to about 4.75, less than or equal to about 4.5, less than or equal to about 4.25, or less than or equal to about 4.

Aspect 6. The catalyst defined in any one of the preceding aspects, wherein the supported chromium catalyst comprises (from 0 wt. %, from about 0.5 wt. %, from about 1 wt. %, or from about 2 wt. % to) less than or equal to about 75 wt. %, less than or equal to about 50 wt. %, less than or equal to about 40 wt. %, or less than or equal to about 30 wt. % of chromium (VI), based on the total amount of chromium.

Aspect 7. The catalyst defined in any one of aspects 1-6, wherein the solid support comprises any suitable solid oxide or any solid oxide disclosed herein, e.g., silica, alumina, silica-alumina, silica-coated alumina, aluminum phosphate, aluminophosphate, heteropolytungstate, titania, zirconia, magnesia, boria, zinc oxide, silica-titania, silica-zirconia, alumina-titania, alumina-zirconia, zinc-aluminate, alumina-boria, alumina borate, silica-boria, aluminophosphate-silica, titania-zirconia, or any combination thereof.

Aspect 8. The catalyst defined in any one of aspects 1-6, wherein the solid support comprises silica, silica-alumina, silica-coated alumina, silica-titania, silica-titania-magnesia, silica-zirconia, silica-magnesia, silica-boria, aluminophosphate-silica, alumina, alumina borate, or any combination thereof.

Aspect 9. The catalyst defined in any one of aspects 1-6, wherein the solid support comprises a chemically-treated solid oxide comprising a solid oxide (e.g., as in aspect 7 or 8) treated with an electron-withdrawing anion.

Aspect 10. The catalyst defined in aspect 9, wherein the electron-withdrawing anion comprises sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, tungstate, molybdate, or any combination thereof.

Aspect 11. The catalyst defined in aspect 9 or 10, wherein the chemically-treated solid oxide contains from about 1 to about 30 wt. %, from about 2 to about 20 wt. %, from about 2 to about 15 wt. %, from about 3 to about 12 wt. %, or from 4 to 10 wt. %, of the electron-withdrawing anion, based on the total weight of the chemically-treated solid oxide.

Aspect 12. The catalyst defined in any one of aspects 1-6, wherein the solid support comprises a chemically-treated solid oxide comprising fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

Aspect 13. The catalyst defined in any one of aspects 1-6, wherein the catalyst comprises chromium/silica, chromium/silica-titania, chromium/silica-titania-magnesia, chromium/silica-alumina, chromium/silica-coated alumina, chromium/aluminophosphate, chromium/alumina, chromium/alumina borate, or any combination thereof.

Aspect 14. The catalyst defined in any one of aspects 1-6, wherein the catalyst comprises chromium/silica-titania, and the supported catalyst comprises any suitable amount of titanium or an amount in any range disclosed herein, e.g., from about 0.1 to about 20 wt. %, from about 0.5 to about 15 wt. %, from about 1 to about 10 wt. %, or from about 1 to about 6 wt. %, based on the weight of the catalyst.

Aspect 15. The catalyst defined in any one of aspects 1-6, wherein the catalyst comprises chromium/sulfated alumina, chromium/fluorided alumina, chromium/fluorided silica-alumina, chromium/fluorided silica-coated alumina, or any combination thereof.

Aspect 16. The catalyst defined in any one of aspects 1-6, wherein the catalyst comprises a chromium supported zeolite.

Aspect 17. The catalyst defined in aspect 16, wherein the solid support comprises a medium pore zeolite, a large pore zeolite, or a combination thereof.

Aspect 18. The catalyst defined in aspect 16, wherein the solid support comprises a ZSM-5 zeolite, a ZSM-11 zeolite, a EU-1 zeolite, a ZSM-23 zeolite, a ZSM-57 zeolite, an ALPO4-11 zeolite, an ALPO4-41 zeolite, a Ferrierite framework type zeolite, or a combination thereof.

Aspect 19. The catalyst defined in aspect 16, wherein the solid support comprises an L-zeolite, a Y-zeolite, a mordenite, an omega zeolite, and/or a beta zeolite.

Aspect 20. The catalyst defined in any one of aspects 16-19, wherein the solid support comprises a zeolite and any suitable amount of binder or an amount in any range disclosed herein, e.g., from about 3 wt. % to about 35 wt. %, or from about 5 wt. % to about 30 wt. % binder, based on the weight of the catalyst.

Aspect 21. The catalyst defined in any one of the preceding aspects, wherein the catalyst has any suitable pore volume (total) or a pore volume (total) in any range disclosed herein, e.g., from about 0.1 to about 5 mL/g, from about 0.15 to about 5 mL/g, from about 0.1 to about 3 mL/g, or from about 0.15 to about 2 mL/g.

Aspect 22. The catalyst defined in any one of the preceding aspects, wherein the catalyst has any suitable BET surface area or a BET surface area in any range disclosed herein, e.g., from about 50 to about 2000 $m^2/g$, from about 50 to about 700 $m^2/g$, from about 50 to about 400 $m^2/g$, from about 100 to about 1200 $m^2/g$, or from about 150 to about 525 $m^2/g$.

Aspect 23. The catalyst defined in any one of the preceding aspects, wherein the catalyst has any suitable average (d50) particle size or an average (d50) particle size in any range disclosed herein, e.g., from about 10 to about 500 microns, from about 25 to about 250 microns, or from about 20 to about 100 microns.

Aspect 24. The catalyst defined in any one of aspects 1-23, wherein the hydrocarbon group is a saturated or unsaturated, linear or branched, aliphatic hydrocarbon group.

Aspect 25. The catalyst defined in any one of aspects 1-23, wherein the hydrocarbon group is an aromatic group.

Aspect 26. The catalyst defined in any one of aspects 1-23, wherein the hydrocarbon group is a linear alkane group, a branched alkane group, or a cyclic alkane group.

Aspect 27. The catalyst defined in any one of aspects 1-23, wherein an alkoxy group is bonded to the chromium.

Aspect 28. The catalyst defined in any one of aspects 1-23, wherein an aryloxy group is bonded to the chromium.

Aspect 29. The catalyst defined in any one of aspects 1-23, wherein the hydrocarbon group is any suitable carbon number hydrocarbon group or any carbon number hydrocarbon group disclosed herein, e.g., a $C_1$ to $C_{36}$ hydrocarbon group, a $C_1$ to $C_{18}$ hydrocarbon group, a $C_1$ to $C_{12}$ hydrocarbon group, or a $C_1$ to $C_8$ hydrocarbon group.

Aspect 30. The catalyst defined in any one of aspects 1-23, wherein the hydrocarbon group is a methane group, an ethane group, a propane group, a butane (e.g., n-butane or isobutane) group, a pentane (e.g., n-pentane, neopentane, or isopentane) group, a hexane group, a heptane group, an octane group, a nonane group, a decane group, an undecane group, a dodecane group, a tridecane group, a tetradecane group, a pentadecane group, a hexadecane group, a heptadecane group, or an octadecane group.

Aspect 31. The catalyst defined in any one of aspects 1-23, wherein the hydrocarbon group is a methane group, an ethane group, a propane group, a n-butane group, an isobutane group, a n-pentane group, a neopentane group, an isopentane group, a n-hexane group, a n-heptane group, a n-octane group, a n-decane group, or a n-dodecane group.

Aspect 32. The catalyst defined in any one of aspects 1-23, wherein the hydrocarbon group is a benzene group, a toluene group, an ethylbenzene group, a xylene group, or a mesitylene group.

Aspect 33. An ethylene polymer having (or characterized by):
a Mw in a range from about 100,000 to about 400,000 g/mol;
at least about 2 wt. % of the polymer having a molecular weight greater than 1,000,000 g/mol; and
at least about 1.5 wt. % of the polymer having a molecular weight less than 1000 g/mol.

Aspect 34. The polymer defined in aspect 33, wherein the ethylene polymer has a Mn in any range disclosed herein, e.g., from about 3,000 to about 10,000 g/mol, from about 4,000 to about 9,000 g/mol, from about 4,000 to about 8,000 g/mol, from about 4,000 to about 7,000 g/mol, or from about 5,000 to about 6,000 g/mol.

Aspect 35. The polymer defined in aspect 33 or 34, wherein the ethylene polymer has a Mw in any range disclosed herein, e.g., from about 100,000 to about 300,000 g/mol, from about 150,000 to about 400,000 g/mol, from about 200,000 to about 400,000 g/mol, or from about 200,000 to about 300,000 g/mol.

Aspect 36. The polymer defined in any one of aspects 33-35, wherein the ethylene polymer has a Mz in any range disclosed herein, e.g., from about 1,500,000 to about 4,000,000 g/mol, from about 2,000,000 to about 3,500,000 g/mol, or from about 2,000,000 to about 3,000,000 g/mol.

Aspect 37. The polymer defined in any one of aspects 33-36, wherein the ethylene polymer has a Mp in any range disclosed herein, e.g., from about 10,000 to about 60,000 g/mol, from about 10,000 to about 50,000 g/mol, from about 10,000 to about 40,000 g/mol, or from about 15,000 to about 30,000 g/mol.

Aspect 38. The polymer defined in any one of aspects 33-37, wherein the ethylene polymer has a ratio of Mw/Mn in any range disclosed herein, e.g., from about 30 to about 80, from about 35 to about 75, from about 35 to about 60, from about 40 to about 55, or from about 45 to about 50

Aspect 39. The polymer defined in any one of aspects 33-38, wherein the ethylene polymer has a ratio of Mz/Mw in any range disclosed herein, e.g., from about 6 to about 13, from about 8 to about 11, from about 8.5 to about 10.5, or from about 9 to about 10.

Aspect 40. The polymer defined in any one of aspects 33-39, wherein an amount of the ethylene polymer in any range disclosed herein, e.g., from about 2 to about 10 wt. %, from about 3 to about 10 wt. %, from about 4 to about 9 wt. %, from about 5 to about 9 wt. %, or from about 5 to about 8 wt. %, has a molecular weight greater than 1,000,000 g/mol.

Aspect 41. The polymer defined in any one of aspects 33-40, wherein an amount of the ethylene polymer in any range disclosed herein, e.g., from about 1.5 to about 8 wt. %, from about 2 to about 7 wt. %, from about 3 to about 6 wt. %, from about 3.5 to about 5 wt.

%, or from about 4 to about 4.5 wt. %, has a molecular weight less than 1000 g/mol.

Aspect 42. The polymer defined in any one of aspects 33-41, wherein an amount of the ethylene polymer in any range disclosed herein, e.g., from about 8 to about 20 wt. %, from about 10 to about 20 wt. %, from about 12 to about 18 wt. %, from about 13 to about 17 wt. %, or from about 14 to about 16 wt. %, has a molecular weight less than 3162 g/mol.

Aspect 43. The polymer defined in any one of aspects 33-42, wherein an amount of the ethylene polymer in any range disclosed herein, e.g., from about 53 to about 73 wt. %, from about 55 to about 70 wt. %, from about 58 to about 68 wt. %, or from about 61 to about 65 wt. %, has a molecular weight in the 10,000 to 1,000,000 g/mol range.

Aspect 44. The polymer defined in any one of aspects 33-43, wherein the ethylene polymer has a highest molecular weight detected in any range disclosed herein, e.g., at least about 5,000,000 g/mol, at least about 6,000,000 g/mol, at least about 7,000,000 g/mol, or at least about 8,000,000 g/mol.

Aspect 45. An ethylene homopolymer having (or characterized by):
  a number of methyl short chain branches (SCB's) in a range from about 3.5 to about 15 per 1000 total carbon atoms;
  a number of butyl short chain branches (SCB's) of less than or equal to about 0.6 per 1000 total carbon atoms; and
  a ratio of Mw/Mn in a range from about 4 to about 10.

Aspect 46. The homopolymer defined in aspect 45, wherein the number of methyl SCB's is in any range disclosed herein, e.g., from about 3.5 to about 12, from about 3.5 to about 10.5, from about 4 to about 12, from about 4 to about 10, from about 4.5 to about 10, or from about 5 to about 10 methyl SCB's per 1000 total carbon atoms.

Aspect 47. The homopolymer defined in aspect 45 or 46, wherein the number of butyl SCB's is in any range disclosed herein, e.g., less than or equal to about 0.5, less than or equal to about 0.4, less than or equal to about 0.3, or less than or equal to about 0.2 butyl SCB's per 1000 total carbon atoms.

Aspect 48. The homopolymer defined in any one of aspects 45-47, wherein the ratio of Mw/Mn is in any range disclosed herein, e.g., from about 4 to about 9, from about 4 to about 8.5, from about 4 to about 8, from about 4.5 to about 10, from about 4.5 to about 8.5, or from about 5 to about 9.

Aspect 49. The homopolymer defined in any one of aspects 45-48, wherein the homopolymer has a ratio of Mz/Mw in any range disclosed herein, e.g., from about 2.5 to about 7, from about 2.5 to about 6, from about 3 to about 7, or from about 3 to about 6.

Aspect 50. The homopolymer defined in any one of aspects 45-49, wherein the homopolymer has a Mw in any range disclosed herein, e.g., from about 30,000 to about 200,000 g/mol, from about 30,000 to about 140,000 g/mol, from about 35,000 to about 150,000 g/mol, or from about 40,000 to about 135,000 g/mol.

Aspect 51. The homopolymer defined in any one of aspects 45-50, wherein the homopolymer has ratio of vinyl chain ends to saturated chain ends (vinyl/saturated) per 1000 total carbon atoms in any range disclosed herein, e.g., less than or equal to about 1, less than or equal to about 0.5, less than or equal to about 0.3, or less than or equal to about 0.1.

Aspect 52. The homopolymer defined in any one of aspects 45-51, wherein the homopolymer has a number of ethyl SCB's is in any range disclosed herein, e.g., from about 0.8 to about 5, from about 1 to about 5, from about 0.8 to about 4, from about 1 to about 4, from about 0.8 to about 3.5, from about 1 to about 3.5, or from about 1.5 to about 3.5 ethyl SCB's per 1000 total carbon atoms.

Aspect 53. The homopolymer defined in any one of aspects 45-52, wherein the homopolymer has a density in any range disclosed herein, e.g., from about 0.93 to about 0.96 g/cm$^3$, from about 0.93 to about 0.955 g/cm$^3$, from about 0.935 to about 0.955 g/cm$^3$, from about 0.935 to about 0.950 g/cm$^3$, or from about 0.938 to about 0.948 g/cm$^3$.

Aspect 54. The homopolymer defined in any one of aspects 45-53, wherein the homopolymer contains, independently, less than 0.1 ppm (by weight), less than 0.08 ppm, less than 0.05 ppm, or less than 0.03 ppm, of nickel and iron.

Aspect 55. The homopolymer defined in any one of aspects 45-54, wherein the homopolymer contains, independently, less than 0.1 ppm (by weight), less than 0.08 ppm, less than 0.05 ppm, or less than 0.03 ppm, of titanium, zirconium, and hafnium.

Aspect 56. An ethylene polymer comprising:
  a terminal branched alkane group;
  a terminal cyclic alkane group;
  a terminal aromatic group; or
  a terminal halogenated hydrocarbon group.

Aspect 57. The polymer defined in aspect 56, wherein the ethylene polymer comprises an ethylene homopolymer.

Aspect 58. The polymer defined in aspect 56, wherein the ethylene polymer comprises an ethylene/α-olefin copolymer.

Aspect 59. The polymer defined in aspect 56, wherein the ethylene polymer comprises an ethylene/1-butene copolymer, an ethylene/1-hexene copolymer, and/or an ethylene/1-octene copolymer.

Aspect 60. The polymer defined in aspect 56, wherein the ethylene polymer comprises an ethylene/1-hexene copolymer.

Aspect 61. The polymer defined in any one of aspects 56-60, wherein the branched alkane group is any carbon number branched alkane group disclosed herein, e.g., a $C_4$ to $C_{36}$ branched alkane group, a $C_4$ to $C_{18}$ branched alkane group, a $C_{10}$ to $C_{36}$ branched alkane group, or a $C_{10}$ to $C_{36}$ branched alkane group.

Aspect 62. The polymer defined in any one of aspects 56-60, wherein the cyclic alkane group is any carbon number cyclic alkane group disclosed herein, e.g., a $C_4$ to $C_{36}$ cyclic alkane group, a $C_4$ to $C_{18}$ cyclic alkane group, a $C_6$ to $C_{18}$ cyclic alkane group, or a $C_6$ to $C_{10}$ cyclic alkane group.

Aspect 63. The polymer defined in any one of aspects 56-60, wherein the aromatic group is a benzene group, a toluene group, an ethylbenzene group, a xylene group, or a mesitylene group.

Aspect 64. The polymer defined in any one of aspects 56-60, wherein the halogenated hydrocarbon group is any carbon number halogenated hydrocarbon group disclosed herein, e.g., a $C_1$ to $C_{36}$ halogenated hydrocarbon group, a $C_1$ to $C_{18}$ halogenated hydrocarbon group, a $C_1$ to $C_{12}$ halogenated hydrocarbon group, or a $C_1$ to $C_8$ halogenated hydrocarbon group.

Aspect 65. An article comprising the polymer defined in any one of aspects 33-64.

We claim:

1. An ethylene homopolymer having:
   a number of methyl short chain branches (SCB's) in a range from about 3.5 to about 15 per 1000 total carbon atoms;
   a number of butyl short chain branches (SCB's) of less than or equal to about 0.6 per 1000 total carbon atoms; and
   a ratio of Mw/Mn in a range from about 4 to about 10.

2. The homopolymer of claim 1, wherein the homopolymer has:
   a ratio of Mz/Mw in a range from about 2.5 to about 7;
   a Mw in a range from about 30,000 to about 200,000 g/mol; and
   a density in a range from about 0.93 to about 0.96 g/cm$^3$.

3. The homopolymer of claim 1, wherein:
   the number of methyl SCB's is in a range from about 5 to about 10 per 1000 total carbon atoms;
   the number of butyl SCB's is less than or equal to about 0.2 per 1000 total carbon atoms; and
   the ratio of Mw/Mn is in a range from about 4.5 to about 8.5.

4. The homopolymer of claim 3, wherein the homopolymer has:
   a ratio of Mz/Mw in a range from about 3 to about 6;
   a Mw in a range from about 40,000 to about 135,000 g/mol; and
   a density in a range from about 0.935 to about 0.955 g/cm$^3$.

5. The homopolymer of claim 1, wherein the homopolymer has a number of ethyl SCB's in a range from about 0.8 to about 5 per 1000 total carbon atoms.

6. The homopolymer of claim 1, wherein the homopolymer has a ratio of vinyl chain ends to saturated chain ends per 1000 total carbon atoms of less than or equal to about 0.3.

7. The homopolymer of claim 1, wherein the homopolymer contains less than 0.1 ppm by weight of nickel, iron, titanium, zirconium, or hafnium.

8. An article comprising the homopolymer of claim 1.

9. The homopolymer of claim 1, wherein the homopolymer has:
   a ratio of Mz/Mw in a range from about 2.5 to about 7;
   a Mw in a range from about 30,000 to about 200,000 g/mol;
   a density in a range from about 0.93 to about 0.96 g/cm$^3$; or
   any combination thereof.

10. The homopolymer of claim 9, wherein:
    the number of methyl SCB's is in a range from about 5 to about 10 per 1000 total carbon atoms;
    the number of butyl SCB's is less than or equal to about 0.2 per 1000 total carbon atoms;
    the ratio of Mw/Mn is in a range from about 4.5 to about 8.5; or
    any combination thereof.

11. The homopolymer of claim 9, wherein the homopolymer has a number of ethyl SCB's in a range from about 0.8 to about 5 per 1000 total carbon atoms.

12. The homopolymer of claim 9, wherein the homopolymer has a ratio of vinyl chain ends to saturated chain ends per 1000 total carbon atoms of less than or equal to about 0.3.

13. The homopolymer of claim 9, wherein the homopolymer contains less than 0.1 ppm by weight of nickel, iron, titanium, zirconium, or hafnium.

14. An article comprising the homopolymer of claim 9.

15. The homopolymer of claim 1, wherein the homopolymer has:
    a ratio of Mz/Mw in a range from about 3 to about 6;
    a Mw in a range from about 40,000 to about 135,000 g/mol;
    a density in a range from about 0.935 to about 0.955 g/cm$^3$; or
    any combination thereof.

16. The homopolymer of claim 15, wherein:
    the number of methyl SCB's is in a range from about 5 to about 10 per 1000 total carbon atoms;
    the number of butyl SCB's is less than or equal to about 0.2 per 1000 total carbon atoms;
    the ratio of Mw/Mn is in a range from about 4.5 to about 8.5; or
    any combination thereof.

17. The homopolymer of claim 15, wherein the homopolymer has a number of ethyl SCB's in a range from about 0.8 to about 5 per 1000 total carbon atoms.

18. The homopolymer of claim 15, wherein the homopolymer has a ratio of vinyl chain ends to saturated chain ends per 1000 total carbon atoms of less than or equal to about 0.3.

19. The homopolymer of claim 15, wherein the homopolymer contains less than 0.1 ppm by weight of nickel, iron, titanium, zirconium, or hafnium.

20. An article comprising the homopolymer of claim 15.

* * * * *